(12) United States Patent
Wenren et al.

(10) Patent No.: US 11,650,398 B2
(45) Date of Patent: May 16, 2023

(54) CAMERA LENS ASSEMBLY

(71) Applicant: Zhejiang Sunny Optical Co., Ltd, Ningbo (CN)

(72) Inventors: Jianke Wenren, Ningbo (CN); Lingbo He, Ningbo (CN); Yuhao Wang, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 411 days.

(21) Appl. No.: 16/834,072

(22) Filed: Mar. 30, 2020

(65) Prior Publication Data

US 2020/0225452 A1 Jul. 16, 2020

Related U.S. Application Data

(63) Continuation of application No. PCT/CN2019/077465, filed on Mar. 8, 2019.

(30) Foreign Application Priority Data

Jun. 5, 2018 (CN) .......................... 201810570519.1

(51) Int. Cl.
*G02B 13/00* (2006.01)
*G02B 9/62* (2006.01)

(52) U.S. Cl.
CPC .......... *G02B 13/0045* (2013.01); *G02B 9/62* (2013.01)

(58) Field of Classification Search
CPC .......... H04N 5/2254; G02B 3/04; G02B 9/64; G02B 9/62; G02B 13/001; G02B 13/04; G02B 13/18; G02B 13/06; G02B 13/0045; G02B 27/0025; G02B 27/0012
USPC ....... 359/766, 750, 751, 754, 713, 756, 759, 359/757
See application file for complete search history.

(56) References Cited

U.S. PATENT DOCUMENTS

| | | | |
|---|---|---|---|
| 2016/0216486 A1 | 7/2016 | Tanaka | |
| 2016/0231533 A1 | 8/2016 | Mercado | |
| 2018/0081153 A1 | 3/2018 | Huang | |
| 2019/0121081 A1* | 4/2019 | Huang | .................. G02B 13/18 |

FOREIGN PATENT DOCUMENTS

| | | |
|---|---|---|
| CN | 202256850 U | 5/2012 |
| CN | 102819095 A | 12/2012 |
| CN | 103576295 A | 2/2014 |
| CN | 105372793 A | 3/2016 |
| CN | 106997084 A | 8/2017 |

(Continued)

*Primary Examiner* — Travis S Fissel
(74) *Attorney, Agent, or Firm* — Sughrue Mion, PLLC

(57) ABSTRACT

The present disclosure discloses a camera lens assembly including, sequentially from an object side to an image side along an optical axis, a first lens, a second lens, a third lens, a fourth lens, a fifth lens and a sixth lens. The first lens has a positive refractive power; the second lens has a positive refractive power; the third lens has a refractive power; the fourth lens has a refractive power and an object-side surface thereof is a convex surface; the fifth lens has a positive refractive power; and the sixth lens has a negative refractive power. Half of a diagonal length ImgH of an effective pixel area on an imaging plane of the camera lens assembly and a total effective focal length f of the camera lens assembly satisfy $0.4 < ImgH/f < 0.6$.

18 Claims, 17 Drawing Sheets

(56) References Cited

FOREIGN PATENT DOCUMENTS

| | | | |
|---|---|---|---|
| CN | 107300747 | A | 10/2017 |
| CN | 107515456 | A | 12/2017 |
| CN | 108089298 | A | 5/2018 |
| CN | 208477188 | U | 2/2019 |
| JP | 2017-203933 | A | 11/2017 |
| TW | I536039 | B | 6/2016 |

* cited by examiner

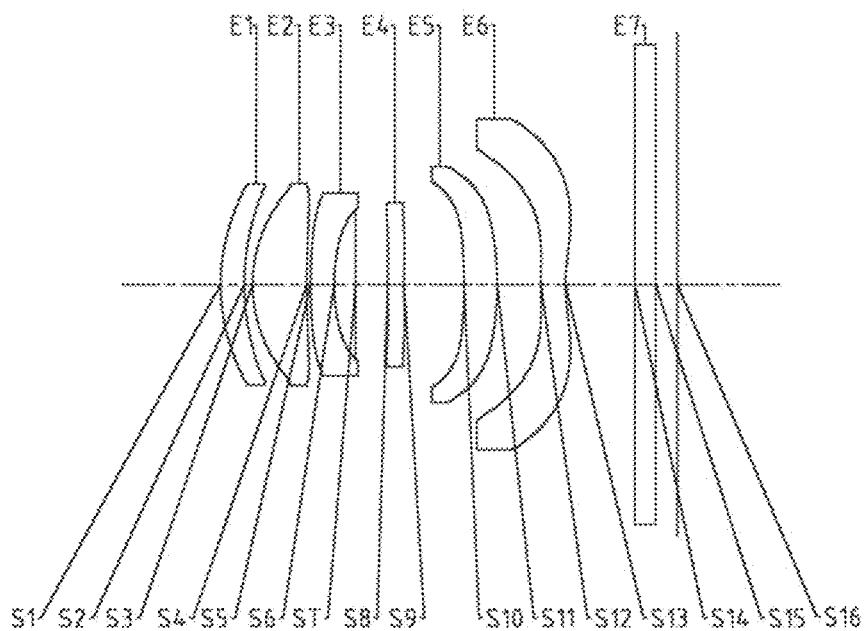
Fig. 1
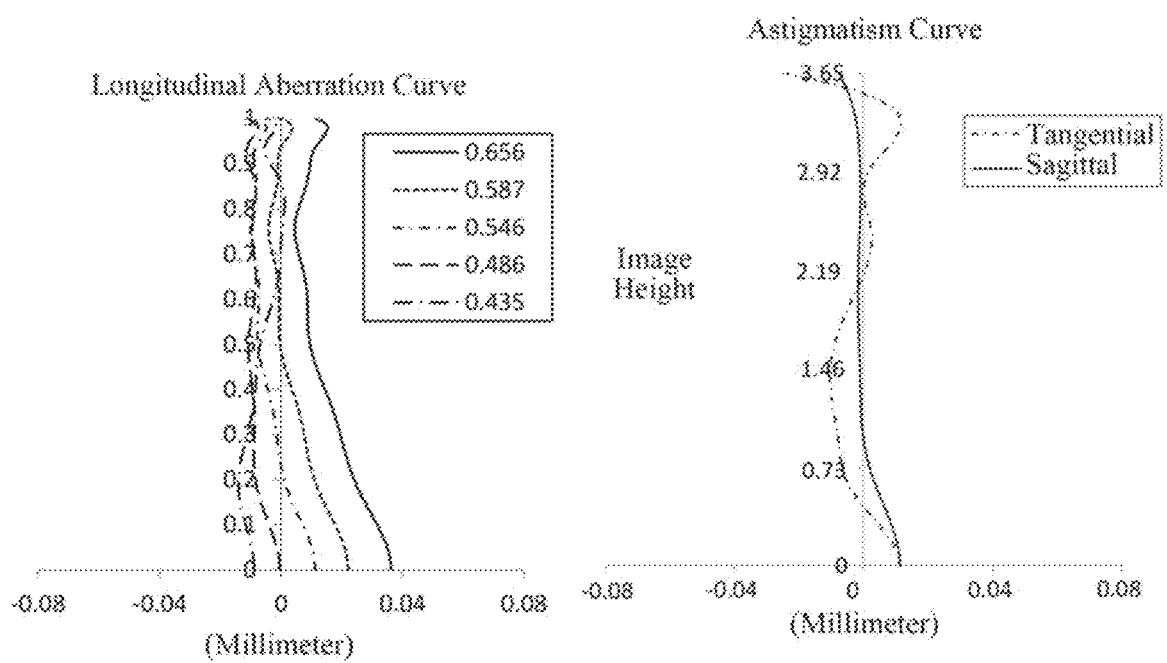
Fig. 2A
Fig. 2B

CAMERA LENS ASSEMBLY

CROSS-REFERENCE TO RELATED APPLICATIONS

The present patent application is a continuation of International Application No. PCT/CN2019/077465, filed on Mar. 8, 2019, which claims priority to Chinese Patent Application No. 201810570519.1, filed in the China National Intellectual Property Administration (CNIPA) on Jun. 5, 2018. Both of the aforementioned patent applications are hereby incorporated by reference in their entireties.

TECHNICAL FIELD

The present disclosure relates to a camera lens assembly, and more specifically, relates to a camera lens assembly including six lenses.

BACKGROUND

With the advancement of science and technology and the rapid development of portable electronic products such as smart phones, people are increasingly demanding the shooting functions of portable electronic products. In order to meet the shooting needs of various scenes, the camera lens assembly of smart-phones has gradually developed from a single camera to a multi-camera, such as a dual camera formed by a combination of a wide-angle lens assembly and a telephoto lens assembly, to achieve the function of optical zoom.

At present, the existing telephoto lens assemblies on the market generally cannot take into account aspects such as large image surface, long focal length, small aberrations, and high image quality, and thus may not meet the requirements of the dual-camera technology for telephoto lens assemblies.

SUMMARY

The present disclosure provides a camera lens assembly, for example, a camera lens assembly that may be applied as a telephoto lens assembly to a dual-camera technology, that is applicable to portable electronic products and at least solves or partially addresses at least one of the above disadvantages of the prior art.

In one aspect, the present disclosure provides a camera lens assembly which includes, sequentially from an object side to an image side along an optical axis, a first lens, a second lens, a third lens, a fourth lens, a fifth lens and a sixth lens. The first lens may have a positive refractive power; the second lens may have a positive refractive power; the third lens has a positive refractive power or a negative refractive power; the fourth lens has a positive refractive power or a negative refractive power, and an object-side surface thereof may be a convex surface; the fifth lens may have a positive refractive power; and the sixth lens may have a negative refractive power.

In one embodiment, half of a diagonal length ImgH of an effective pixel area on an imaging plane of the camera lens assembly and a total effective focal length f of the camera lens assembly may satisfy 0.4<ImgH/f<0.6.

In one embodiment, an effective focal length f1 of the first lens, a radius of curvature R1 of an object-side surface of the first lens and a radius of curvature R2 of an image-side surface of the first lens may satisfy 2<f1/(R1+R2)<4.5.

In one embodiment, an effective focal length f2 of the second lens and a radius of curvature R3 of an object-side surface of the second lens may satisfy 1.5<f2/|R3|<2.5.

In one embodiment, an effective focal length f5 of the fifth lens and an effective focal length f6 of the sixth lens may satisfy −2.5<f5/f6<−1.5.

In one embodiment, a radius of curvature R7 of the object-side surface of the fourth lens and a radius of curvature R8 of an image-side surface of the fourth lens may satisfy 0.2<R8/R7≤1.

In one embodiment, an effective focal length f5 of the fifth lens and a radius of curvature R9 of an object-side surface of the fifth lens may satisfy 1<|f5/R9|<2.

In one embodiment, a distance TTL on the optical axis from an object-side surface of the first lens to an imaging plane of the camera lens assembly and a total effective focal length f of the camera lens assembly may satisfy TTL/f<1.1.

In one embodiment, a spaced distance T45 between the fourth lens and the fifth lens on the optical axis, a spaced distance T34 between the third lens and the fourth lens on the optical axis and a center thickness CT4 of the fourth lens on the optical axis may satisfy 0.6<T45/(T34+CT4)<1.5.

In one embodiment, a center thickness CT1 of the first lens on the optical axis and a center thickness CT2 of the second lens on the optical axis may satisfy 2<CT2/CT1<2.5.

In one embodiment, a combined focal length f56 of the fifth lens and the sixth lens and a combined focal length f123 of the first lens, the second lens and the third lens may satisfy 1.5<f56/f123|<4.

In one embodiment, a maximum effective radius DT11 of an object-side surface of the first lens, a maximum effective radius DT21 of an object-side surface of the second lens and a maximum effective radius DT51 of an object-side surface of the fifth lens may satisfy 1 mm<DT11×DT21/DT51<2 mm.

In one embodiment, half of a maximal field-of-view HFOV of the camera lens assembly may satisfy 20°<HFOV<30°.

In one embodiment, an image-side surface of the first lens may be a concave surface, an object-side surface of the second lens may be a convex surface and an object-side surface of the fifth lens may be a concave surface.

In another aspect, the present disclosure provides a camera lens assembly which includes, sequentially from an object side to an image side along an optical axis, a first lens, a second lens, a third lens, a fourth lens, a fifth lens and a sixth lens. The first lens may have a positive refractive power, and an image-side surface thereof may be a concave surface; the second lens may have a positive refractive power, and an object-side surface thereof may be a convex surface; the third lens has a positive refractive power or a negative refractive power; the fourth lens has a positive refractive power or a negative refractive power; the fifth lens may have a positive refractive power, and an object-side surface thereof may be a concave surface; and the sixth lens may have a negative refractive power. Here, half of a maximal field-of-view HFOV of the camera lens assembly may satisfy 20°<HFOV<30°.

The present disclosure employs a plurality of (for example, six) lenses, and the camera lens assembly has at least one advantageous effect such as long focal length, large image surface, small aberration and high image quality and the like by rationally assigning the refractive power, the surface shape, the center thickness of each lens, and the on-axis spaced distance between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the accompanying drawings:

FIG. 1 illustrates a schematic structural view of a camera lens assembly according to Example 1 of the present disclosure;

FIGS. 2A to 2D illustrate a longitudinal aberration curve, an astigmatic curve, a distortion curve and a lateral color curve of the camera lens assembly of the Example 1, respectively;

DETAILED DESCRIPTION OF EMBODIMENTS

Figure 2C:
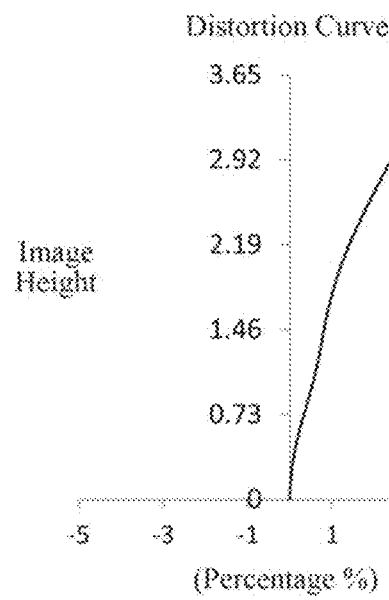

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been slightly exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object side is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples. The features, principles, and other aspects of the present disclosure are described in detail below.

A camera lens assembly according to an exemplary embodiment of the present disclosure may include, for example, six lenses having refractive power, i.e. a first lens, a second lens, a third lens, a fourth lens, a fifth lens and a sixth lens. The six lenses are arranged sequentially from an object side to an image side along an optical axis, and an air gap may be provided between each adjacent lens.

In an exemplary embodiment, the first lens may have a positive refractive power; the second lens may have a positive refractive power; the third lens has a positive refractive power or a negative refractive power; the fourth lens has a positive refractive power or a negative refractive power, and an object-side surface thereof may be a convex surface; the fifth lens may have a positive refractive power; and the sixth lens may have a negative refractive power.

In an exemplary embodiment, an object-side surface of the first lens may be a convex surface, and an image-side surface of the first lens may be a concave surface. An object-side surface of the second lens may be a convex surface. An image-side surface of the third lens may be a concave surface. An image-side surface of the fourth lens may be a concave surface. An object-side surface of the fifth lens may be a concave surface, and an image-side surface of the fifth lens may be a convex surface. An image-side surface of the sixth lens may be a concave surface.

By controlling the surface shape of each lens in the camera lens assembly, the assembly stability of the camera lens assembly is advantageously ensured, which is in turn to conducive to the mass production of the lens assembly. At the same time, reasonable surface arrangement is beneficial to improve the image quality of the camera lens assembly.

In an exemplary embodiment, the camera lens assembly according to the present disclosure may satisfy: $20°<HFOV<30°$, where HFOV is half of a maximal field-of-view of the camera lens assembly. More specifically, HFOV may further satisfy: $25°\leq HFOV<30°$, for example, $24.7°\leq HFOV\leq 28.6°$. When the conditional expression of $20°<HFOV<30°$ is satisfied, the full field-of-view of the camera lens assembly may be ensured to be less than 60 degrees, and the imaging effect may be improved.

In an exemplary embodiment, the camera lens assembly according to the present disclosure may satisfy: $0.4<ImgH/f<0.6$, where ImgH is half of a diagonal length of an effective pixel area on an imaging plane of the camera lens assembly and f is a total effective focal length of the camera lens assembly. More specifically, ImgH and f may further satisfy: $0.48\leq ImgH/f\leq 0.57$. By controlling the ratio of ImgH to f, the telephoto ratio of the camera lens assembly may be effectively improved, the magnification of the shooting may be increased, and the image quality may be improved.

In an exemplary embodiment, the camera lens assembly according to the present disclosure may satisfy: $2<f1/(R1+R2)<4.5$, where f1 is an effective focal length of the first lens, R1 is a radius of curvature of an object-side surface of the first lens and R2 is a radius of curvature of an image-side surface of the first lens. More specifically, f1, R1 and R2 may further satisfy: $2.2\geq f1/(R1+R2)\leq 3.8$, for example, $2.45\geq f1/(R1+R2)\leq 3.55$. When the conditional expression of $2<f1/(R1+R2)<4.5$ is satisfied, the overall focal length of the lens assembly may be effectively increased, and the refractive power of the first lens may be reasonably assigned, which reduces the processing sensitivity of the actual parts.

In an exemplary embodiment, the camera lens assembly according to the present disclosure may satisfy: $1.5<f2/|R3|<2.5$, where f2 is an effective focal length of the second lens and R3 is a radius of curvature of an object-side surface of the second lens. More specifically, f2 and R3 may further satisfy: $1.60\leq f2/|R3|\leq 2.30$, for example, $1.77\leq f2/|R3|\leq 2.16$. Reasonably assigning the refractive power of the second lens is beneficial to ensure that the full field-of-view of the camera lens assembly is less than 60 degrees and improve the imaging effect.

In an exemplary embodiment, the camera lens assembly according to the present disclosure may satisfy: $-2.5<f5/f6<-1.5$, where f5 is an effective focal length of the fifth lens and f6 is an effective focal length of the sixth lens. More specifically, f5 and f6 may further satisfy: $-2.45\leq f5/f6\leq -1.59$. By controlling the effective focal lengths of the fifth lens and the sixth lens, the optical distortion of the camera lens assembly may be reduced.

In an exemplary embodiment, the camera lens assembly according to the present disclosure may satisfy: $TTL/f<1.1$, where TTL is a distance on the optical axis from an object-side surface of the first lens to an imaging plane of the camera lens assembly and f is a total effective focal length of the camera lens assembly. More specifically, TTL and f may further satisfy: $0.9<TTL/f<1.1$, for example, $0.96\leq TTL/f\leq 1.04$. By controlling the ratio of TTL to f, the telephoto ability of the camera lens assembly may be improved, thereby ensuring that the lens assembly has a higher modulation transfer function (MTF) design value. At the same time, more excellent camera effects are advantageously obtained.

In an exemplary embodiment, the camera lens assembly according to the present disclosure may satisfy: $0.2<R8/R7\leq 1$, where R7 is a radius of curvature of the object-side surface of the fourth lens and R8 is a radius of curvature of an image-side surface of the fourth lens. More specifically, R8 and R7 may further satisfy: $0.23\leq R8/R7\leq 1.00$. By optimizing the radii of curvature of the object-side surface and the image-side surface of the fourth lens, the on-axis chromatic aberration of the camera lens assembly may be reduced, and the MTF value of the off-axis field may be increased, thereby meeting higher imaging requirements.

In an exemplary embodiment, the camera lens assembly according to the present disclosure may satisfy: $0.6<T45/(T34+CT4)<1.5$, where T45 is a spaced distance between the fourth lens and the fifth lens on the optical axis, T34 is a spaced distance between the third lens and the fourth lens on the optical axis and CT4 is a center thickness of the fourth lens on the optical axis. More specifically, T45, T34 and CT4 may further satisfy: $0.70\leq T45/(T34+CT4)\leq 1.40$, for example, $0.79\leq T45/(T34+CT4)\leq 1.31$. When the conditional expression of $0.6<T45/(T34+CT)<1.5$ is satisfied, the processability of the third lens, the fourth lens, and the fifth lens may be effectively ensured, so as to better conform to the molding characteristics of plastic lenses, thereby making production and assembly more stable.

In an exemplary embodiment, the camera lens assembly according to the present disclosure may satisfy: 2<CT2/CT1<2.5, where CT1 is a center thickness of the first lens on the optical axis and CT2 is a center thickness of the second lens on the optical axis. More specifically, CT2 and CT1 may further satisfy: 2.23≤CT2/CT1≤2.46. When the conditional expression 2<CT2/CT1<2.5 is satisfied, the processability of the first lens and the second lens may be effectively ensured, so as to better conform to the molding characteristics of the plastic lens.

In an exemplary embodiment, the camera lens assembly according to the present disclosure may satisfy: 1<|f5/R9|<2, where f5 is an effective focal length of the fifth lens and R9 is a radius of curvature of an object-side surface of the fifth lens. More specifically, f5 and R9 may further satisfy: 1.10≤|f5/R9|≤1.98. By controlling the ratio of the radius of curvature of the object-side surface of the fifth lens to the effective focal length of the fifth lens, the off-axis chromatic aberration of the camera lens assembly is advantageously reduced, the sensitivity of the fifth lens is reduced, and the production yield of the lens assembly is improved.

In an exemplary embodiment, the camera lens assembly according to the present disclosure may satisfy: 1.5<|f56/f123|<4, where f56 is a combined focal length of the fifth lens and the sixth lens and f123 is a combined focal length of the first lens, the second lens and the third lens. More specifically, f56 and f123 may further satisfy: 1.60≤|f56/f123|≤3.90. When the conditional expression 1.5<|f56/f123|≤4 is satisfied, the distortion at the edge field-of-view of the camera lens assembly may be effectively reduced, and the relative brightness of the edge field of view may be ensured, thereby having better camera imaging effects.

In an exemplary embodiment, the camera lens assembly according to the present disclosure may satisfy: 1 mm<DT11×DT21/DT51<2 mm, where DT11 is a maximum effective radius of an object-side surface of the first lens, DT21 is a maximum effective radius of an object-side surface of the second lens and DT51 is a maximum effective radius of an object-side surface of the fifth lens. More specifically, DT11, DT21 and DT51 may further satisfy: 1.1 mm≤DT11×DT21/DT51≤1.7 mm, for example, 1.22 mm≤DT11×DT21/DT51≤1.58 mm. When the conditional expression 1 mm<DT11×DT21/DT51<2 mm is satisfied, the lens assembly may have a larger focal length, the aperture size may be increased, and the depth of field range may be appropriately controlled to meet the shooting needs in more scenes.

In an exemplary embodiment, the camera lens assembly described above may further include at least one diaphragm to improve the image quality of the lens assembly. Optionally, the diaphragm may be disposed between the object side and the first lens. Optionally, the above camera lens assembly may further include an optical filter for correcting the color deviation and/or a protective glass for protecting the photosensitive element on the imaging plane.

The camera lens assembly according to the above embodiments of the present disclosure may employ a plurality of lenses, such as six lenses as described above. By properly assigning the refractive power of each lens, the surface shape, the center thickness of each lens, and spaced distances on the optical axis between the lenses, the size and the sensitivity of the imaging lens assembly may be effectively reduced, and the workability of the imaging lens assembly may be improved, such that the camera lens assembly is more advantageous for production processing and may be applied to portable electronic products. The camera lens assembly configured as described above may also have advantageous effects such as long focal length, large image surface, small optical aberration, and excellent image quality, and may be better applied to the dual-camera technology. The camera lens assembly is used as a telephoto lens assembly in combination with other well-known wide-angle lens assemblies to form a dual camera lens assembly.

In the embodiments of the present disclosure, at least one of the surfaces of each lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. By using an aspheric lens, the aberrations that occur during imaging may be eliminated as much as possible, and thus improving the image quality.

However, it will be understood by those skilled in the art that the number of lenses constituting the camera lens assembly may be varied to achieve the various results and advantages described in this specification without departing from the technical solution claimed by the present disclosure. For example, although the embodiment is described by taking six lenses as an example, the camera lens assembly is not limited to include six lenses. The camera lens assembly may also include other numbers of lenses if desired. Some specific examples of a camera lens assembly applicable to the above embodiment will be further described below with reference to the accompanying drawings.

Example 1

A camera lens assembly according to example 1 of the present disclosure is described below with reference to FIG. 1 to FIG. 2D. FIG. 1 shows a schematic structural view of the camera lens assembly according to example 1 of the present disclosure.

As shown in FIG. 1, the camera lens assembly according to an exemplary embodiment of the present disclosure includes a first lens E1, a second lens E2, a third lens E3, a fourth lens E4, a fifth lens E5, a sixth lens E6, an optical filter E7 and an imaging plane S16, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a negative refractive power. An object-side surface S8 of the fourth lens E4 is a convex surface, and an image-side surface S9 of the fourth lens E4 is a concave surface. The fifth lens E5 has a positive refractive power. An object-side surface S10 of the fifth lens E5 is a concave surface, and an image-side surface S11 of the fifth lens E5 is a convex surface. The sixth lens E6 has a negative refractive power. An object-side surface S12 of the sixth lens E6 is a convex surface, and an image-side surface S13 of the sixth lens E6 is a concave surface. The optical filter E7 has an object-side surface S14 and an image-side surface S15. Light from an object sequentially passes through the respective surfaces S1 to S15 and is finally imaged on the imaging plane S16.

In the camera lens assembly of this example, a diaphragm STO for restricting a light beam may be disposed between the object side and the first lens E1 to improve image quality. Optionally, the camera lens assembly of this example may further include a vignetting diaphragm ST disposed between the third lens E3 and the fourth lens E4.

Table 1 shows surface type, radius of curvature, thickness, material and conic coefficient of each lens of the camera lens assembly in example 1, wherein the units for the radius of curvature and the thickness are millimeter (mm).

TABLE 1

| Surface number | Surface type | Radius of curvature | Thickness | Material Refractive index | Abbe number | Conic coefficient |
|---|---|---|---|---|---|---|
| OBJ | spherical | infinite | infinite | | | |
| S1(STO) | aspheric | 2.7793 | 0.3428 | 1.55 | 56.1 | 0.0000 |
| S2 | aspheric | 3.4522 | 0.1200 | | | 0.0000 |
| S3 | aspheric | 2.0730 | 0.7824 | 1.55 | 56.1 | −0.1092 |
| S4 | aspheric | 11.7408 | 0.0545 | | | −8.7584 |
| S5 | aspheric | 7.3316 | 0.3420 | 1.67 | 20.4 | 22.5959 |
| S6 | aspheric | 2.8606 | 0.3101 | | | 3.6925 |
| ST | spherical | infinite | 0.4610 | | | |
| S8 | aspheric | 14.2932 | 0.2375 | 1.55 | 56.1 | −30.6223 |
| S9 | aspheric | 12.1401 | 0.8662 | | | 58.9432 |
| S10 | aspheric | −8.6492 | 0.4802 | 1.67 | 20.4 | 23.1550 |
| S11 | aspheric | −4.4132 | 0.6305 | | | 0.0000 |
| S12 | aspheric | 10.7450 | 0.3563 | 1.55 | 56.1 | 25.2094 |
| S13 | aspheric | 2.4704 | 1.0029 | | | −6.2803 |
| S14 | spherical | infinite | 0.3000 | 1.52 | 64.2 | |
| S15 | spherical | infinite | 0.3137 | | | |
| S16 | spherical | infinite | | | | |

As can be seen from Table 1, the object-side surface and the image-side surface of any one of the first lens E1 to the sixth lens E6 are aspheric. In this example, the surface shape x of each aspheric lens may be defined by using, but not limited to, the following aspheric formula:

$$x = \frac{ch^2}{1 + \sqrt{1 - (k+1)c^2 h^2}} + \sum A_i h^i \qquad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient (given in the above Table 1); Ai is a correction coefficient for the i-th order of the aspheric surface. Table 2 below shows high-order coefficients A4, A6, A8, A10, A12, A14, A16, A18 and A20 applicable to each aspheric surface S1-S6 and S8-S13 in example 1.

TABLE 2

| Surface number | A4 | A6 | A8 | A10 | A12 |
|---|---|---|---|---|---|
| S1 | −3.2870E−03 | −1.1068E−02 | 1.2798E−02 | −9.1779E−03 | 6.2666E−03 |
| S2 | 6.8057E−03 | −5.9096E−02 | 1.1418E−01 | −1.2117E−01 | 8.2044E−02 |
| S3 | 1.3962E−02 | −5.6284E−02 | 1.3401E−01 | −1.8690E−01 | 1.7255E−01 |
| S4 | −3.7133E−02 | 4.5140E−02 | 4.7866E−03 | −8.9016E−02 | 1.0702E−01 |
| S5 | −3.3356E−02 | 5.0681E−02 | 3.5999E−02 | −1.6588E−01 | 1.9982E−01 |
| S6 | −2.9246E−03 | 4.0171E−02 | −8.2081E−02 | 3.2249E−01 | −8.0143E−01 |
| S8 | −5.8400E−02 | −6.3285E−02 | 2.2537E−01 | −4.0420E−01 | 5.3056E−01 |
| S9 | −5.9930E−02 | −8.0331E−02 | 2.7089E−01 | −5.3362E−01 | 7.3284E−01 |
| S10 | 2.1534E−02 | −9.8167E−02 | 1.2375E−01 | −1.3956E−01 | 1.0888E−01 |
| S11 | 3.0233E−02 | −6.7965E−02 | 5.3797E−02 | −3.3426E−02 | 1.3625E−02 |
| S12 | −1.5883E−01 | 2.7824E−02 | 1.3372E−02 | −9.6096E−03 | 1.9434E−03 |
| S13 | −1.4524E−01 | 6.1180E−02 | −1.8351E−02 | 3.6757E−03 | −4.9915E−04 |

TABLE 2-continued

| Surface number | A14 | A16 | A18 | A20 |
|---|---|---|---|---|
| S1 | −4.1029E−03 | 1.8761E−03 | −4.7021E−04 | 4.7424E−05 |
| S2 | −3.6749E−02 | 1.0825E−02 | −1.9415E−03 | 1.6019E−04 |
| S3 | −1.0783E−01 | 4.2802E−02 | −9.4782E−03 | 8.5365E−04 |
| S4 | −5.9021E−02 | 1.6660E−02 | −2.4444E−03 | 1.7285E−04 |
| S5 | −1.1565E−01 | 3.2620E−02 | −3.6421E−03 | 0.0000E+00 |
| S6 | 1.1855E+00 | −1.0106E+00 | 4.6333E−01 | −8.9292E−02 |
| S8 | −4.7590E−01 | 2.8441E−01 | −1.0062E−01 | 1.5549E−02 |
| S9 | −6.5547E−01 | 3.6617E−01 | −1.1481E−01 | 1.5303E−02 |
| S10 | −5.7201E−02 | 1.8506E−02 | −3.2249E−03 | 2.2914E−04 |
| S11 | −3.9180E−03 | 7.6108E−04 | −8.4729E−05 | 3.9457E−06 |
| S12 | −8.0815E−05 | −1.9702E−05 | 2.5132E−06 | −8.6477E−08 |
| S13 | 4.2908E−05 | −2.1361E−06 | 5.3870E−08 | −4.9377E−10 |

Table 3 shows effective focal lengths f1 to f6 of respective lens, a total effective focal length f of the camera lens assembly, a total track length TTL (i.e., the distance from the object-side surface S1 of the first lens E1 to the imaging plane S16 on the optical axis) and half of a maximal field-of-view HFOV in example 1.

TABLE 3

| f1 (mm) | 22.11 | f6 (mm) | −5.96 |
|---|---|---|---|
| f2 (mm) | 4.48 | f (mm) | 6.70 |
| f3 (mm) | −7.24 | TTL (mm) | 6.60 |
| f4 (mm) | −153.45 | HFOV (°) | 27.7 |
| f5 (mm) | 12.90 | | |

Figure 2D:
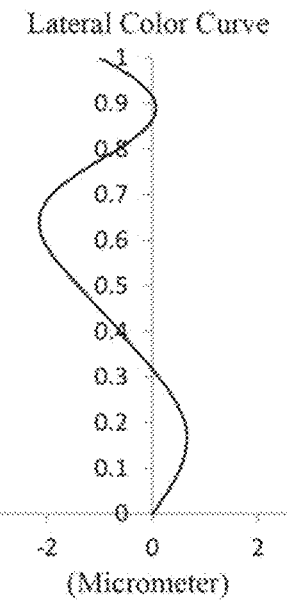

FIG. 2A illustrates a longitudinal aberration curve of the camera lens assembly according to example 1, representing deviations of focal points converged by light of different wavelengths after passing through the camera lens assembly. FIG. 2B illustrates an astigmatism curve of the camera lens assembly according to example 1, representing a curvature of a tangential plane and a curvature of a sagittal plane. FIG. 2C illustrates a distortion curve of the camera lens assembly according to example 1, representing amounts of distortion at different image heights. FIG. 2D illustrates a lateral color curve of the camera lens assembly according to example 1, representing deviations of different image heights on an imaging plane after light passes through the camera lens assembly. It can be seen from FIG. 2A to FIG. 2D that the camera lens assembly provided in example 1 may achieve good image quality.

Example 2

Figure 3:
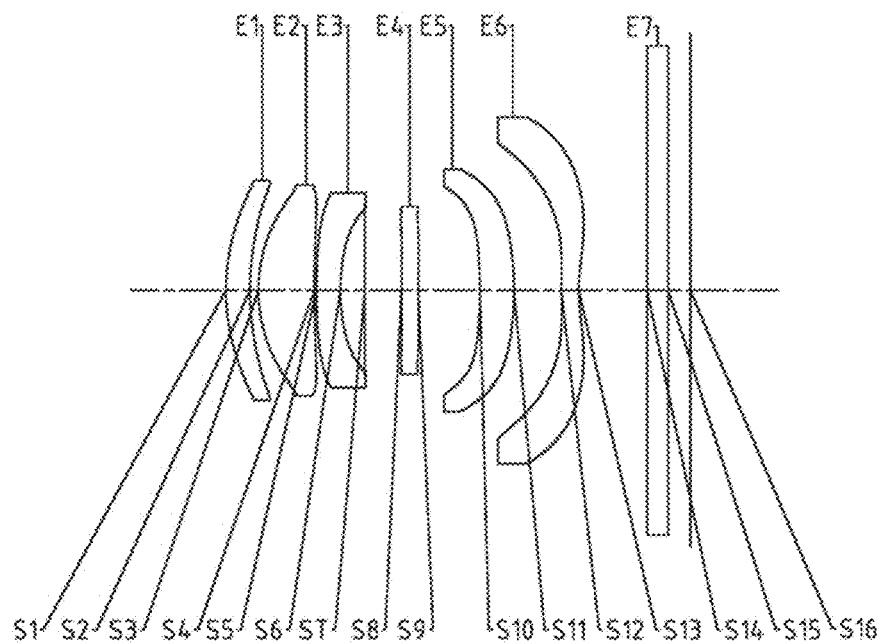
FIG. 3 illustrates a schematic structural view of a camera lens assembly according to Example 2 of the present disclosure.

A camera lens assembly according to example 2 of the present disclosure is described below with reference to FIG. 3 to FIG. 4D. In this example and the following examples, for the purpose of brevity, the description of parts similar to those in example 1 will be omitted. FIG. 3 is a schematic structural view of the camera lens assembly according to example 2 of the present disclosure.

As shown in FIG. 3, the camera lens assembly according to an exemplary embodiment of the present disclosure includes a first lens E1, a second lens E2, a third lens E3, a fourth lens E4, a fifth lens E5, a sixth lens E6, an optical filter E7 and an imaging plane S16, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a negative refractive power. An object-side surface S8 of the fourth lens E4 is a convex surface, and an image-side surface S9 of the fourth lens E4 is a concave surface. The fifth lens E5 has a positive refractive power. An object-side surface S10 of the fifth lens E5 is a concave surface, and an image-side surface S11 of the fifth lens E5 is a convex surface. The sixth lens E6 has a negative refractive power. An object-side surface S12 of the sixth lens E6 is a convex surface, and an image-side surface S13 of the sixth lens E6 is a concave surface. The optical filter E7 has an object-side surface S14 and an image-side surface S15. Light from an object sequentially passes through the respective surfaces S1 to S15 and is finally imaged on the imaging plane S16.

In the camera lens assembly of this example, a diaphragm STO for restricting a light beam may be disposed between the object side and the first lens E1 to improve image quality. Optionally, the camera lens assembly of this example may further include a vignetting diaphragm ST disposed between the third lens E3 and the fourth lens E4.

Table 4 shows surface type, radius of curvature, thickness, material and conic coefficient of each lens of the camera lens assembly in example 2, wherein the units for the radius of curvature and the thickness are millimeter (mm). Table 5 shows high-order coefficients applicable to each aspheric surface in example 2, wherein the surface shape of each aspheric surface may be defined by the formula (1) given in the above example 1. Table 6 shows effective focal lengths f1 to f6 of respective lens, a total effective focal length f of the camera lens assembly, a total track length TTL and half of a maximal field-of-view HFOV in example 2.

TABLE 4

| Surface number | Surface type | Radius of curvature | Thickness | Material Refractive index | Abbe number | Conic coefficient |
|---|---|---|---|---|---|---|
| OBJ | spherical | infinite | infinite | | | |
| S1(STO) | aspheric | 2.8543 | 0.3428 | 1.55 | 56.1 | 0.0000 |
| S2 | aspheric | 3.8913 | 0.1200 | | | 0.0000 |
| S3 | aspheric | 2.2201 | 0.7937 | 1.55 | 56.1 | −0.0510 |
| S4 | aspheric | 12.6196 | 0.0300 | | | −6.6189 |
| S5 | aspheric | 7.6061 | 0.3420 | 1.67 | 20.4 | 23.1256 |
| S6 | aspheric | 2.9788 | 0.3449 | | | 3.6283 |
| ST | spherical | infinite | 0.5227 | | | |
| S8 | aspheric | 14.0915 | 0.2375 | 1.55 | 56.1 | 19.9866 |
| S9 | aspheric | 11.6474 | 0.8750 | | | 65.5573 |
| S10 | aspheric | −9.0406 | 0.4869 | 1.67 | 20.4 | 30.9467 |
| S11 | aspheric | −4.3439 | 0.6724 | | | 0.0000 |
| S12 | aspheric | 11.1397 | 0.2472 | 1.55 | 56.1 | 23.6006 |
| S13 | aspheric | 2.4099 | 0.9712 | | | −13.1688 |
| S14 | spherical | infinite | 0.3000 | 1.52 | 64.2 | |
| S15 | spherical | infinite | 0.3137 | | | |
| S16 | spherical | infinite | | | | |

TABLE 5

| Surface number | A4 | A6 | A8 | A10 | A12 |
|---|---|---|---|---|---|
| S1 | −9.7973E−03 | −6.0176E−03 | 9.8803E−03 | −1.4571E−02 | 1.8091E−02 |
| S2 | 2.4857E−03 | −6.7650E−02 | 1.6175E−01 | −2.2626E−01 | 2.0991E−01 |
| S3 | 1.5216E−02 | −6.0378E−02 | 1.5343E−01 | −2.3347E−01 | 2.3319E−01 |
| S4 | −3.6596E−02 | 4.4789E−02 | 2.0284E−01 | −7.9811E−02 | 9.2336E−02 |
| S5 | −3.2348E−02 | 4.4209E−02 | 4.3794E−02 | −1.5582E−01 | 1.7305E−01 |
| S6 | −5.8647E−03 | 6.0023E−02 | −1.8532E−01 | 6.0252E−01 | −1.2159E+00 |
| S8 | −6.6061E−02 | −6.6236E−02 | 3.6699E−01 | −8.7780E−01 | 1.3597E+00 |
| S9 | −7.5979E−02 | −2.7305E−02 | 1.4744E−01 | −2.6442E−01 | 3.1171E−01 |
| S10 | −2.9400E−03 | −5.8343E−02 | 5.9146E−02 | −7.1276E−02 | 6.1994E−02 |
| S11 | 2.1716E−02 | −5.1564E−02 | 3.4639E−02 | −2.1115E−02 | 9.0454E−03 |
| S12 | −1.9053E−01 | 9.4295E−02 | −3.3423E−02 | 8.8146E−03 | −2.1099E−03 |
| S13 | −1.2519E−01 | 6.0729E−02 | −2.0347E−02 | 4.4705E−03 | −6.5031E−04 |

| Surface number | A14 | A16 | A18 | A20 |
|---|---|---|---|---|
| S1 | −1.4060E−02 | 6.2932E−03 | −1.4873E−03 | 1.4263E−04 |
| S2 | −1.2805E−01 | 4.9060E−02 | −1.0641E−02 | 9.8863E−04 |
| S3 | −1.5356E−01 | 6.3198E−02 | −1.4532E−02 | 1.3957E−03 |
| S4 | −4.4992E−02 | 8.5683E−03 | 1.4936E−04 | −1.7492E−04 |
| S5 | −9.5257E−02 | 2.5966E−02 | −2.8021E−03 | 0.0000E+00 |
| S6 | 1.5091E+00 | −1.1174E+00 | 4.5414E−01 | −7.8183E−02 |
| S8 | −1.3249E+00 | 7.9250E−01 | −2.6678E−01 | 3.8750E−02 |
| S9 | −2.2666E−01 | 1.0137E−01 | −2.6167E−02 | 3.0495E−03 |
| S10 | −3.6713E−02 | 1.3052E−02 | −2.4216E−03 | 1.7904E−04 |
| S11 | −2.9089E−03 | 6.3324E−04 | −7.6382E−05 | 3.7418E−06 |
| S12 | 3.9886E−04 | −4.6499E−05 | 2.8457E−06 | −6.9850E−08 |
| S13 | 5.9256E−05 | −3.1808E−06 | 9.1082E−08 | −1.0654E−09 |

TABLE 6

| f1 (mm) | 17.55 | f6 (mm) | −5.68 |
|---|---|---|---|
| f2 (mm) | 4.80 | f (mm) | 6.70 |
| f3 (mm) | −7.55 | TTL (mm) | 6.60 |
| f4 (mm) | −127.24 | HFOV (°) | 27.9 |
| f5 (mm) | 12.01 | | |

Figure 4A:
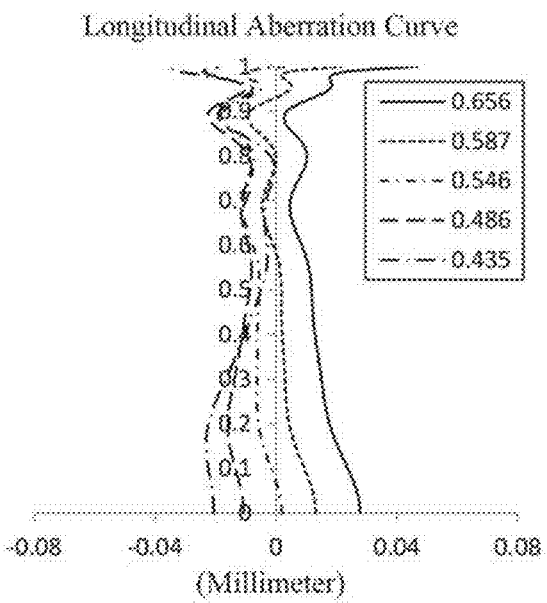
FIGS. 4A to 4D illustrate a longitudinal aberration curve, an astigmatic curve, a distortion curve and a lateral color curve of the camera lens assembly of the Example 2, respectively.
Figure 4B:
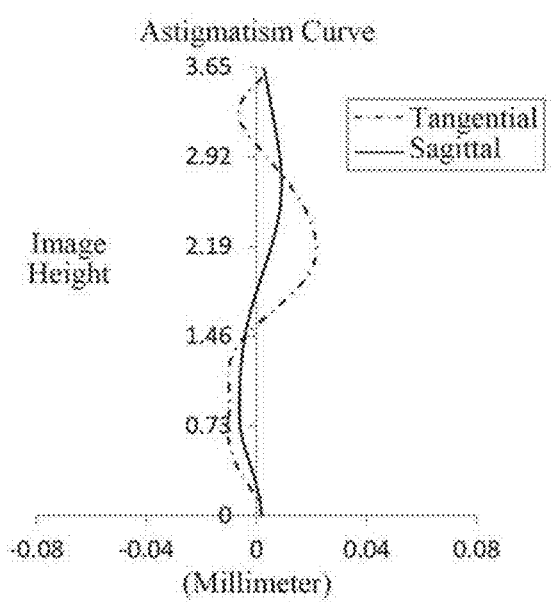
Figure 4C:
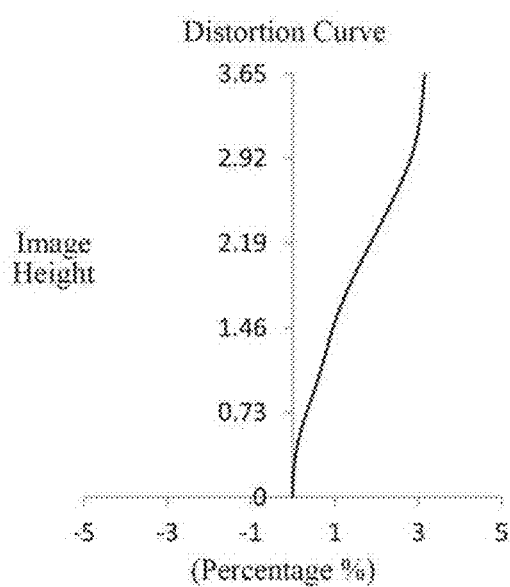
Figure 4D:
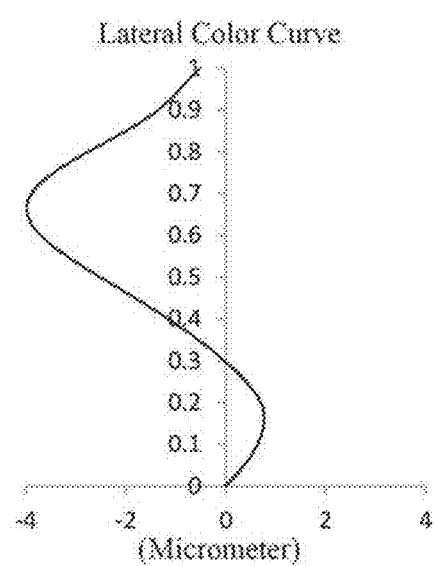

FIG. 4A illustrates a longitudinal aberration curve of the camera lens assembly according to example 2, representing deviations of focal points converged by light of different wavelengths after passing through the camera lens assembly. FIG. 4B illustrates an astigmatism curve of the camera lens assembly according to example 2, representing a curvature of a tangential plane and a curvature of a sagittal plane. FIG. 4C illustrates a distortion curve of the camera lens assembly according to example 2, representing amounts of distortion at different image heights. FIG. 4D illustrates a lateral color curve of the camera lens assembly according to example 2, representing deviations of different image heights on an imaging plane after light passes through the camera lens assembly. It can be seen from FIG. 4A to FIG. 4D that the camera lens assembly provided in example 2 may achieve good image quality.

Example 3

Figure 5:
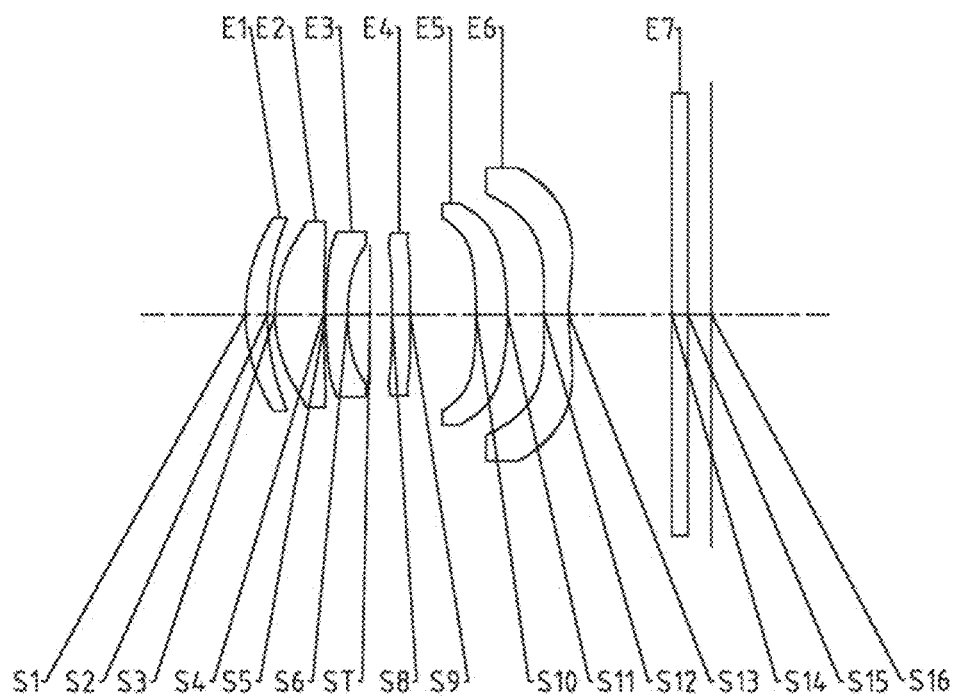
FIG. 5 illustrates a schematic structural view of a camera lens assembly according to Example 3 of the present disclosure.

A camera lens assembly according to example 3 of the present disclosure is described below with reference to FIG. 5 to FIG. 6D. FIG. 5 is a schematic structural view of the camera lens assembly according to example 3 of the present disclosure.

As shown in FIG. 5, the camera lens assembly according to an exemplary embodiment of the present disclosure includes a first lens E1, a second lens E2, a third lens E3, a fourth lens E4, a fifth lens E5, a sixth lens E6, an optical filter E7 and an imaging plane S16, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a negative refractive power. An object-side surface S8 of the fourth lens E4 is a convex surface, and an image-side surface S9 of the fourth lens E4 is a concave surface. The fifth lens E5 has a positive refractive power. An object-side surface S10 of the fifth lens E5 is a concave surface, and an image-side surface S11 of the fifth lens E5 is a convex surface. The sixth lens E6 has a negative refractive power. An object-side surface S12 of the sixth lens E6 is a convex surface, and an image-side surface S13 of the sixth lens E6 is a concave surface. The optical filter E7 has an object-side surface S14 and an image-side surface S15. Light from an object sequentially passes through the respective surfaces S1 to S15 and is finally imaged on the imaging plane S16.

In the camera lens assembly of this example, a diaphragm STO for restricting a light beam may be disposed between the object side and the first lens E1 to improve image quality. Optionally, the camera lens assembly of this example may further include a vignetting diaphragm ST disposed between the third lens E3 and the fourth lens E4.

Table 7 shows surface type, radius of curvature, thickness, material and conic coefficient of each lens of the camera lens assembly in example 3, wherein the units for the radius of curvature and the thickness are millimeter (mm). Table 8 shows high-order coefficients applicable to each aspheric surface in example 3, wherein the surface shape of each aspheric surface may be defined by the formula (1) given in the above example 1. Table 9 shows effective focal lengths f1 to f6 of respective lens, a total effective focal length f of the camera lens assembly, a total track length TTL and half of a maximal field-of-view HFOV in example 3.

TABLE 7

| Surface number | Surface type | Radius of curvature | Thickness | Material Refractive index | Abbe number | Conic coefficient |
|---|---|---|---|---|---|---|
| OBJ | spherical | infinite | infinite | | | |
| S1(STO) | aspheric | 2.3106 | 0.2856 | 1.55 | 56.1 | 0.0000 |
| S2 | aspheric | 3.1181 | 0.1000 | | | 0.0000 |
| S3 | aspheric | 1.8758 | 0.6356 | 1.55 | 56.1 | −0.1729 |
| S4 | aspheric | 10.7737 | 0.0300 | | | 9.0961 |
| S5 | aspheric | 6.4582 | 0.2850 | 1.67 | 20.4 | 24.9691 |
| S6 | aspheric | 2.4266 | 0.2931 | | | 3.4527 |
| ST | spherical | infinite | 0.2893 | | | |
| S8 | aspheric | 67.0594 | 0.2375 | 1.55 | 56.1 | 99.0000 |
| S9 | aspheric | 15.5144 | 0.8647 | | | 91.5521 |
| S10 | aspheric | −6.0924 | 0.4110 | 1.67 | 20.4 | 19.0387 |
| S11 | aspheric | −3.5638 | 0.4754 | | | 0.0000 |
| S12 | aspheric | 11.3341 | 0.3265 | 1.55 | 56.1 | 6.7017 |
| S13 | aspheric | 2.6914 | 1.3512 | | | −3.4883 |
| S14 | spherical | infinite | 0.2100 | 1.52 | 64.2 | |
| S15 | spherical | infinite | 0.3051 | | | |
| S16 | spherical | infinite | | | | |

TABLE 8

| Surface number | A4 | A6 | A8 | A10 | A12 |
|---|---|---|---|---|---|
| S1 | 2.7821E−03 | −7.7176E−02 | 2.8268E−01 | −6.1032E−01 | 7.8386E−01 |
| S2 | 9.2846E−03 | −1.2277E−01 | 5.3429E−01 | −1.3799E+00 | 2.1275E+00 |
| S3 | 7.7474E−03 | 2.3642E−02 | −1.8443E−01 | 6.4502E−01 | −1.3649E+00 |
| S4 | −6.1680E−02 | −4.6917E−03 | 8.2662E−01 | −3.1287E+00 | 5.9401E+00 |
| S5 | −4.9856E−02 | 4.1513E−02 | 5.8540E−01 | −2.1516E+00 | 3.6856E+00 |
| S6 | 5.1814E−03 | 2.7266E−02 | −1.7300E−01 | 1.9356E+00 | −8.0738E+00 |
| S8 | −9.8394E−02 | −2.0906E−01 | 1.3836E+00 | −4.8955E+00 | 1.1248E+01 |
| S9 | −9.8057E−02 | −2.1970E−01 | 1.2809E+00 | −4.2287E+00 | 8.9521E+00 |
| S10 | 3.5429E−02 | −2.0079E−01 | 4.1183E−01 | −7.8207E−01 | 9.6056E−01 |
| S11 | 5.3318E−02 | −1.2563E−01 | 1.3361E−01 | −1.4483E−01 | 1.0398E−01 |
| S12 | −1.9279E−01 | 6.7324E−02 | −3.2490E−02 | 2.3506E−02 | −1.9166E−02 |
| S13 | −2.1526E−01 | 1.1898E−01 | −5.9071E−02 | 2.0815E−02 | −5.0789E−03 |

| Surface number | A14 | A16 | A18 | A20 |
|---|---|---|---|---|
| S1 | −5.9899E−01 | 2.6640E−01 | −6.3400E−02 | 6.1874E−03 |
| S2 | −1.9513E+00 | 1.0442E+00 | −3.0154E−01 | 3.6323E−02 |
| S3 | 1.7785E+00 | −1.3767E+00 | 5.7211E−01 | −9.7813E−02 |
| S4 | −6.6294E+00 | 4.3716E+00 | −1.5690E+00 | 2.3486E−01 |
| S5 | −3.4958E+00 | 1.7837E+00 | −3.8375E−01 | 0.0000E+00 |

TABLE 8-continued

| | | | | |
|---|---|---|---|---|
| S6 | 1.7781E+01 | −2.1898E+01 | 1.4444E+01 | −3.9993E+00 |
| S8 | −1.6308E+01 | 1.4567E+01 | −7.2455E+00 | 1.5204E+00 |
| S9 | −1.1834E+01 | 9.4820E+00 | −4.1753E+00 | 7.7041E−01 |
| S10 | −7.5671E−01 | 3.5837E−01 | −9.0744E−02 | 9.3597E−03 |
| S11 | −4.9644E−02 | 1.4785E−02 | −2.3988E−03 | 1.5940E−04 |
| S12 | 8.0668E−03 | −1.6740E−03 | 1.6819E−04 | −6.5788E−06 |
| S13 | 7.9234E−04 | −7.3065E−05 | 3.5877E−06 | −7.1888E−08 |

TABLE 9

| | | | |
|---|---|---|---|
| f1 (mm) | 14.51 | f6 (mm) | −6.55 |
| f2 (mm) | 4.05 | f(mm) | 6.33 |
| f3 (mm) | −5.99 | TTL (mm) | 6.10 |
| f4 (mm) | −36.99 | HFOV (°) | 24.7 |
| f5 (mm) | 12.07 | | |

Figures 6A, 6B:
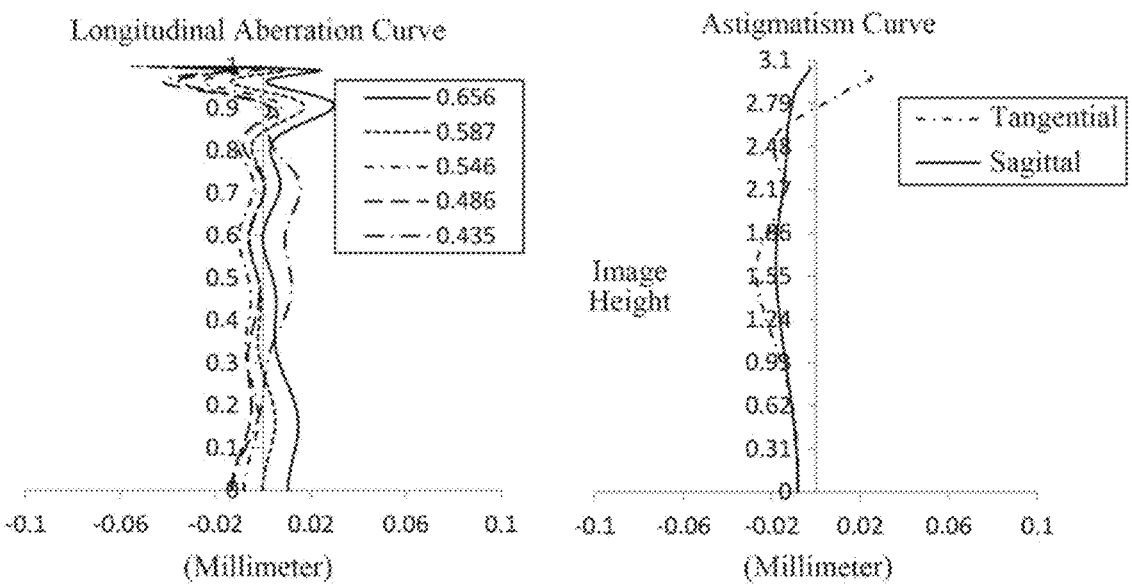
FIGS. 6A to 6D illustrate a longitudinal aberration curve, an astigmatic curve, a distortion curve and a lateral color curve of the camera lens assembly of the Example 3, respectively.
Figure 6C:
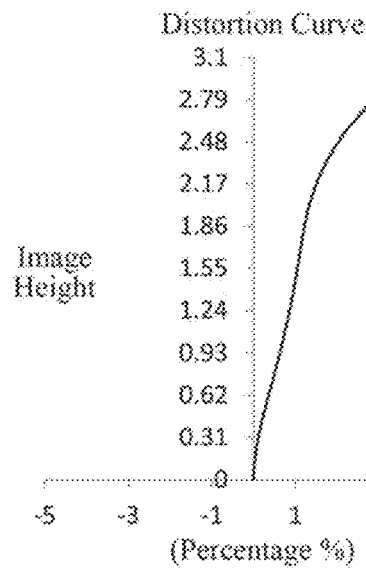
Figure 6D:
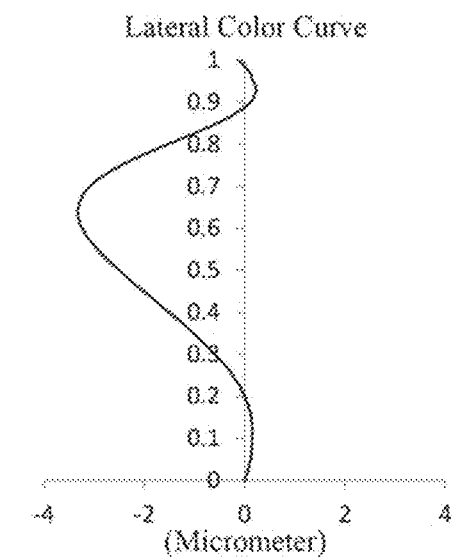

FIG. 6A illustrates a longitudinal aberration curve of the camera lens assembly according to example 3, representing deviations of focal points converged by light of different wavelengths after passing through the camera lens assembly. FIG. 6B illustrates an astigmatism curve of the camera lens assembly according to example 3, representing a curvature of a tangential plane and a curvature of a sagittal plane. FIG. 6C illustrates a distortion curve of the camera lens assembly according to example 3, representing amounts of distortion at different image heights. FIG. 6D illustrates a lateral color curve of the camera lens assembly according to example 3, representing deviations of different image heights on an imaging plane after light passes through the camera lens assembly. It can be seen from FIG. 6A to FIG. 6D that the camera lens assembly provided in example 3 may achieve good image quality.

Example 4

Figure 7:
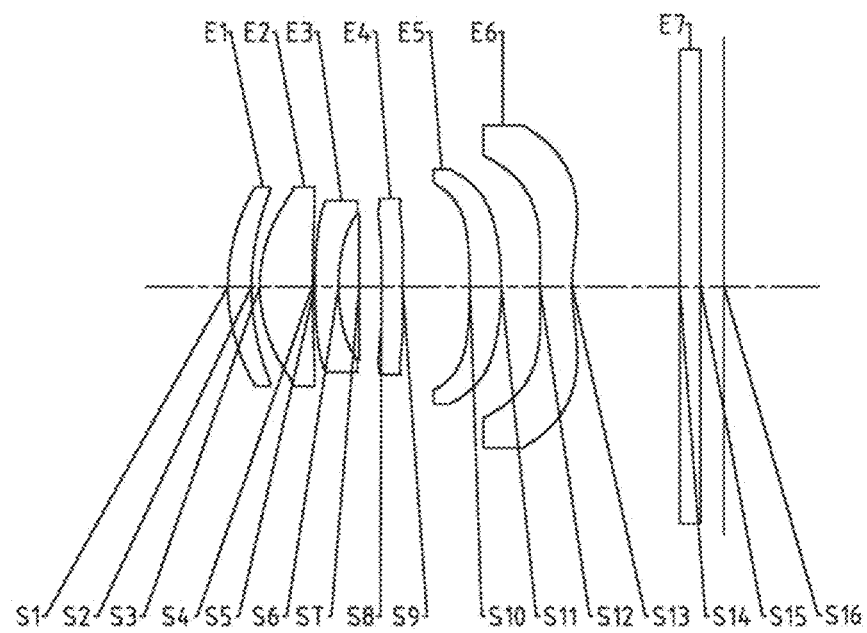
FIG. 7 illustrates a schematic structural view of a camera lens assembly according to Example 4 of the present disclosure.

A camera lens assembly according to example 4 of the present disclosure is described below with reference to FIG. 7 to FIG. 8D. FIG. 7 is a schematic structural view of the camera lens assembly according to example 4 of the present disclosure.

As shown in FIG. 7, the camera lens assembly according to an exemplary embodiment of the present disclosure includes a first lens E1, a second lens E2, a third lens E3, a fourth lens E4, a fifth lens E5, a sixth lens E6, an optical filter E7 and an imaging plane S16, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a negative refractive power. An object-side surface S8 of the fourth lens E4 is a convex surface, and an image-side surface S9 of the fourth lens E4 is a concave surface. The fifth lens E5 has a positive refractive power. An object-side surface S10 of the fifth lens E5 is a concave surface, and an image-side surface S11 of the fifth lens E5 is a convex surface. The sixth lens E6 has a negative refractive power. An object-side surface S12 of the sixth lens E6 is a convex surface, and an image-side surface S13 of the sixth lens E6 is a concave surface. The optical filter E7 has an object-side surface S14 and an image-side surface S15. Light from an object sequentially passes through the respective surfaces S1 to S15 and is finally imaged on the imaging plane S16.

In the camera lens assembly of this example, an aperture diaphragm STO for restricting a light beam may be disposed between the object side and the first lens E1 to improve image quality. Optionally, the camera lens assembly of this example may further include a vignetting diaphragm ST disposed between the third lens E3 and the fourth lens E4.

Table 10 shows surface type, radius of curvature, thickness, material and conic coefficient of each lens of the camera lens assembly in example 4, wherein the units for the radius of curvature and the thickness are millimeter (mm). Table 11 shows high-order coefficients applicable to each aspheric surface in example 4, wherein the surface shape of each aspheric surface may be defined by the formula (1) given in the above example 1. Table 12 shows effective focal lengths f1 to f6 of respective lens, a total effective focal length f of the camera lens assembly, a total track length TTL and half of a maximal field-of-view HFOV in example 4.

TABLE 10

| | | | | Material | | |
|---|---|---|---|---|---|---|
| Surface number | Surface type | Radius of curvature | Thickness | Refractive index | Abbe number | Conic coefficient |
| OBJ | spherical | infinite | infinite | | | |
| S1(STO) | aspheric | 2.7778 | 0.3428 | 1.55 | 56.1 | 0.0000 |
| S2 | aspheric | 3.7010 | 0.1200 | | | 0.0000 |
| S3 | aspheric | 2.2376 | 0.7656 | 1.55 | 56.1 | −0.1661 |
| S4 | aspheric | 13.1085 | 0.0362 | | | 7.5820 |
| S5 | aspheric | 7.8528 | 0.3420 | 1.67 | 20.4 | 24.7744 |
| S6 | aspheric | 2.9369 | 0.2986 | | | 3.4371 |
| ST | spherical | infinite | 0.3250 | | | |
| S8 | aspheric | 76.9729 | 0.3076 | 1.55 | 56.1 | −99.0000 |
| S9 | aspheric | 18.4104 | 0.9764 | | | 87.2913 |
| S10 | aspheric | −7.3316 | 0.4565 | 1.67 | 20.4 | 18.5113 |
| S11 | aspheric | −4.0626 | 0.5594 | | | 0.0000 |
| S12 | aspheric | 11.3366 | 0.4686 | 1.55 | 56.1 | 27.7929 |

TABLE 10-continued

| Surface number | Surface type | Radius of curvature | Thickness | Material Refractive index | Abbe number | Conic coefficient |
|---|---|---|---|---|---|---|
| S13 | aspheric | 3.1367 | 1.5641 | | | −2.8422 |
| S14 | spherical | infinite | 0.3000 | 1.52 | 64.2 | |
| S15 | spherical | infinite | 0.3397 | | | |
| S16 | spherical | infinite | | | | |

TABLE 11

| Surface number | A4 | A6 | A8 | A10 | A12 |
|---|---|---|---|---|---|
| S1 | −2.1773E−03 | −1.3097E−02 | 3.2686E−02 | −5.0417E−02 | 4.6184E−02 |
| S2 | 2.2226E−03 | −2.9026E−02 | 8.0766E−02 | −1.4402E−01 | 1.5891E−01 |
| S3 | 6.2359E−03 | 6.8323E−04 | −2.8126E−02 | 8.4411E−02 | −1.3590E−01 |
| S4 | −3.7167E−02 | 1.5520E−02 | 1.4978E−01 | −4.1233E−01 | 5.3016E−01 |
| S5 | −2.8430E−02 | 1.4506E−02 | 1.7301E−01 | −4.3816E−01 | 5.2238E−01 |
| S6 | 2.2266E−03 | 5.7833E−03 | −7.8619E−03 | 2.4610E−01 | −8.4550E−01 |
| S8 | −5.7341E−02 | −8.1722E−02 | 3.7553E−01 | −9.2151E−01 | 1.4707E+00 |
| S9 | −5.3624E−02 | −1.0121E−01 | 3.9998E−01 | −9.0021E−01 | 1.2946E+00 |
| S10 | 1.9484E−02 | −7.5597E−02 | 1.0616E−01 | −1.4139E−01 | 1.2177E−01 |
| S11 | 2.5460E−02 | −4.3646E−02 | 3.0940E−02 | −2.3348E−02 | 1.1661E−02 |
| S12 | −1.0121E−01 | 1.9199E−02 | −5.3091E−03 | 3.5827E−03 | −2.3580E−03 |
| S13 | −1.0796E−01 | 3.6110E−02 | −1.0622E−02 | 2.2241E−03 | −3.3832E−04 |

| Surface number | A14 | A16 | A18 | A20 |
|---|---|---|---|---|
| S1 | −2.4420E−02 | 7.2266E−03 | −1.0857E−03 | 6.0962E−05 |
| S2 | −1.0424E−01 | 3.9534E−02 | −8.0164E−03 | 6.7290E−04 |
| S3 | 1.3068E−01 | −7.4047E−02 | 2.2426E−02 | −2.7863E−03 |
| S4 | −3.9483E−01 | 1.7229E−01 | −4.0399E−02 | 3.8496E−03 |
| S5 | −3.4615E−01 | 1.2377E−01 | −1.8741E−02 | 0.0000E+00 |
| S6 | 1.3781E+00 | −1.2145E+00 | 5.6658E−01 | −1.1065E−01 |
| S8 | −1.4837E+00 | 9.2398E−01 | −3.2057E−01 | 4.6875E−02 |
| S9 | −1.1642E+00 | 6.3534E−01 | −1.9082E−01 | 2.4053E−02 |
| S10 | −6.6834E−02 | 2.1902E−02 | −3.8215E−03 | 2.7106E−04 |
| S11 | −3.9405E−03 | 8.3793E−04 | −9.6819E−05 | 4.5566E−06 |
| S12 | 7.0090E−04 | −1.0020E−04 | 6.8997E−06 | −1.8475E−07 |
| S13 | 3.3892E−05 | −2.0007E−06 | 6.1455E−08 | −7.4012E−10 |

TABLE 12

| f1 (mm) | 18.01 | f6 (mm) | −8.10 |
|---|---|---|---|
| f2 (mm) | 4.82 | f (mm) | 7.24 |
| f3 (mm) | −7.22 | TTL (mm) | 7.20 |
| f4 (mm) | −44.36 | HFOV (°) | 25.7 |
| f5 (mm) | 12.91 | | |

Figure 8A:
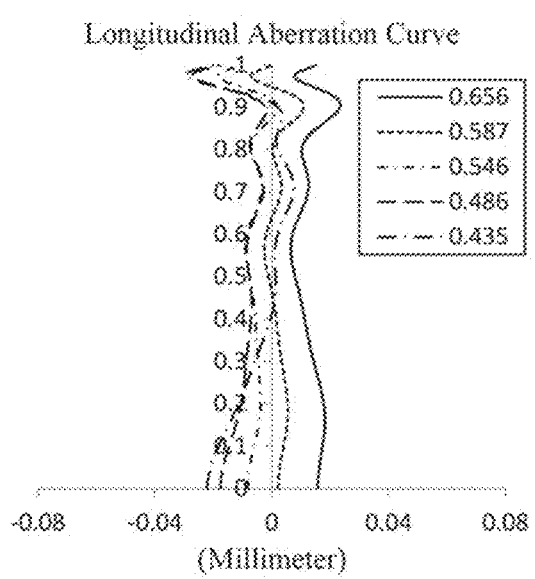
FIGS. 8A to 8D illustrate a longitudinal aberration curve, an astigmatic curve, a distortion curve and a lateral color curve of the camera lens assembly of the Example 4, respectively.
Figure 8B:
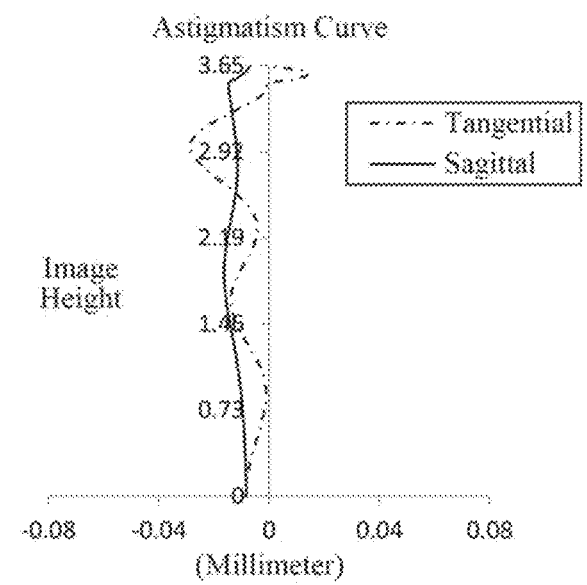
Figure 8C:
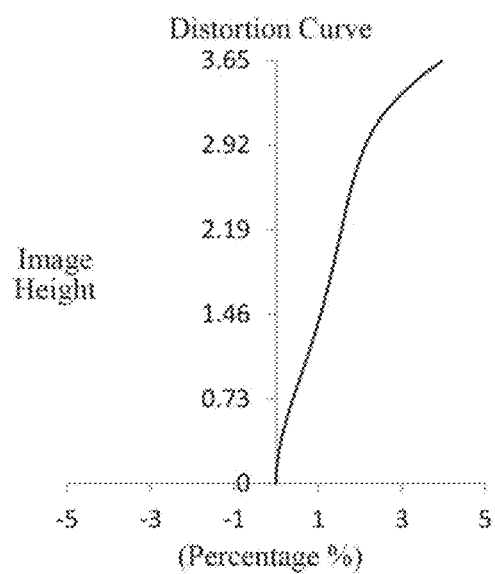
Figure 8D:
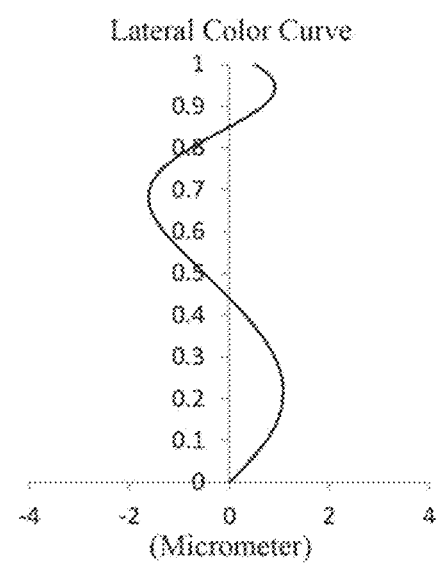

FIG. 8A illustrates a longitudinal aberration curve of the camera lens assembly according to example 4, representing deviations of focal points converged by light of different wavelengths after passing through the camera lens assembly. FIG. 8B illustrates an astigmatism curve of the camera lens assembly according to example 4, representing a curvature of a tangential plane and a curvature of a sagittal plane. FIG. 8C illustrates a distortion curve of the camera lens assembly according to example 4, representing amounts of distortion at different image heights. FIG. 8D illustrates a lateral color curve of the camera lens assembly according to example 4, representing deviations of different image heights on an imaging plane after light passes through the camera lens assembly. It can be seen from FIG. 8A to FIG. 8D that the camera lens assembly provided in example 4 may achieve good image quality.

Example 5

Figure 9:
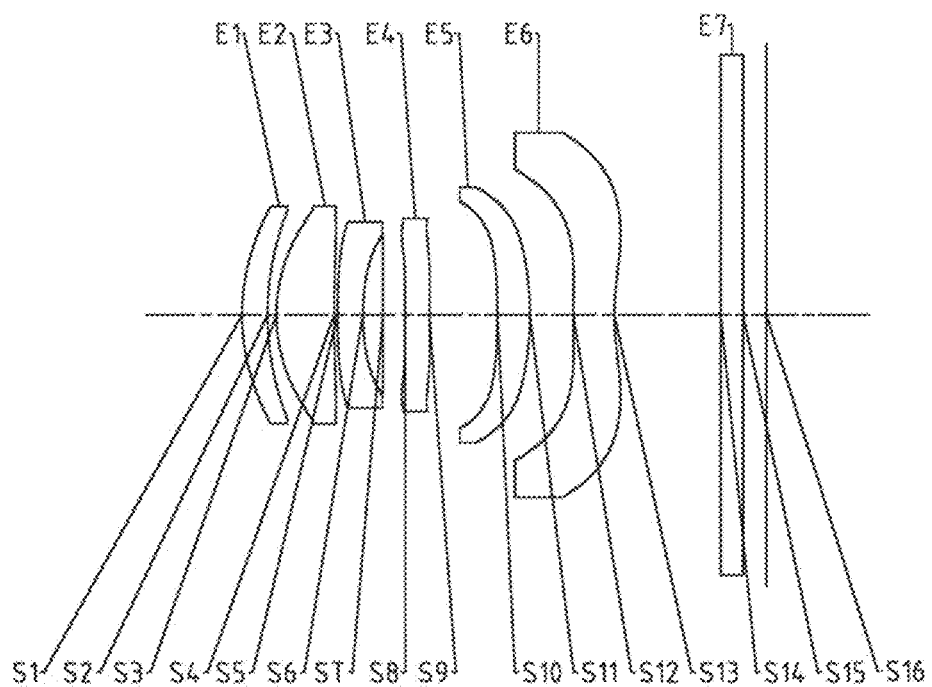
FIG. 9 illustrates a schematic structural view of a camera lens assembly according to Example 5 of the present disclosure.

A camera lens assembly according to example 5 of the present disclosure is described below with reference to FIG. 9 to FIG. 10D. FIG. 9 is a schematic structural view of the camera lens assembly according to example 5 of the present disclosure.

As shown in FIG. 9, the camera lens assembly according to an exemplary embodiment of the present disclosure includes a first lens E1, a second lens E2, a third lens E3, a fourth lens E4, a fifth lens E5, a sixth lens E6, an optical filter E7 and an imaging plane S16, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a negative refractive power. An object-side surface S8 of the fourth lens E4 is a convex surface, and an image-side surface S9 of the fourth lens E4 is a concave surface. The fifth lens E5 has a positive refractive power. An object-side surface S10 of the fifth lens E5 is a concave surface, and an image-side surface S11 of the fifth lens E5 is a convex surface. The sixth lens E6 has a negative refractive power. An object-side surface S12 of the sixth lens E6 is a convex surface, and an image-side surface S13 of the sixth lens E6 is a concave surface. The optical filter E7 has an object-side surface S14 and an image-side surface S15. Light from an object sequentially passes through the respective surfaces S1 to S15 and is finally imaged on the imaging plane S16.

In the camera lens assembly of this example, an aperture diaphragm STO for restricting a light beam may be disposed between the object side and the first lens E1 to improve image quality. Optionally, the camera lens assembly of this example may further include a vignetting diaphragm ST disposed between the third lens E3 and the fourth lens E4.

Table 13 shows surface type, radius of curvature, thickness, material and conic coefficient of each lens of the camera lens assembly in example 5, wherein the units for the radius of curvature and the thickness are millimeter (mm). Table 14 shows high-order coefficients applicable to each aspheric surface in example 5, wherein the surface shape of each aspheric surface may be defined by the formula (1) given in the above example 1. Table 15 shows effective focal lengths f1 to f6 of respective lens, a total effective focal length f of the camera lens assembly, a total track length TTL and half of a maximal field-of-view HFOV in example 5.

TABLE 13

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 (STO) | aspheric | 2.8047 | 0.3428 | 1.55 | 56.1 | 0.0000 |
| S2 | aspheric | 3.6845 | 0.1200 | | | 0.0000 |
| S3 | aspheric | 2.2296 | 0.7770 | 1.55 | 56.1 | −0.1459 |
| S4 | aspheric | 13.8439 | 0.0443 | | | −0.3211 |
| S5 | aspheric | 8.1665 | 0.3420 | 1.67 | 20.4 | 24.2732 |
| S6 | aspheric | 3.0095 | 0.2700 | | | 3.4376 |
| ST | spherical | infinite | 0.2981 | | | |
| S8 | aspheric | 60.7511 | 0.3259 | 1.55 | 56.1 | −99.0000 |
| S9 | aspheric | 17.9187 | 0.9168 | | | 82.0785 |
| S10 | aspheric | −7.4787 | 0.4367 | 1.67 | 20.4 | 18.3382 |
| S11 | aspheric | −4.0639 | 0.5811 | | | 0.0000 |
| S12 | aspheric | 11.1590 | 0.5535 | 1.55 | 56.1 | 27.1947 |
| S13 | aspheric | 3.0414 | 1.4325 | | | −2.6073 |
| S14 | spherical | infinite | 0.3000 | 1.52 | 64.2 | |
| S15 | spherical | infinite | 0.3137 | | | |
| S16 | spherical | infinite | | | | |

TABLE 14

| Surface number | A4 | A6 | A8 | A10 | A12 | A14 | A16 | A18 | A20 |
|---|---|---|---|---|---|---|---|---|---|
| S1 | −4.2808E−03 | −4.3537E−03 | 8.5235E−03 | −1.2219E−02 | 1.1225E−02 | −5.8216E−03 | 1.5905E−03 | −1.9434E−04 | 5.1391E−06 |
| S2 | −6.0718E−04 | −1.2776E−02 | 2.5960E−02 | −3.7383E−02 | 3.9561E−02 | −2.6405E−02 | 1.0237E−02 | −2.1038E−03 | 1.7660E−04 |
| S3 | 5.9223E−03 | 1.7295E−04 | −2.3466E−02 | 6.9152E−02 | −1.0295E−01 | 9.0761E−02 | −4.8273E−02 | 1.4121E−02 | −1.7351E−03 |
| S4 | −3.8389E−02 | 3.2841E−02 | 6.8138E−02 | −2.2366E−01 | 2.8443E−01 | −2.0856E−01 | 9.1957E−02 | −2.2522E−02 | 2.3157E−03 |
| S5 | −3.1419E−02 | 3.8835E−02 | 8.2266E−02 | −2.4948E−01 | 2.9497E−01 | −1.8848E−01 | 6.5416E−02 | −9.8511E−03 | 0.0000E+00 |
| S6 | −1.5364E−04 | 8.4578E−03 | 1.1793E−02 | 1.5121E−01 | −6.4374E−01 | 1.1422E+00 | −1.0593E+00 | 5.1285E−01 | −1.0310E−01 |
| S8 | −5.9056E−02 | −6.2910E−02 | 3.0069E−01 | −7.5776E−01 | 1.2476E+00 | −1.2941E+00 | 8.2659E−01 | −2.9279E−01 | 4.3473E−02 |
| S9 | −5.4051E−02 | −7.4321E−02 | 2.9373E−01 | −6.6321E−01 | 9.6102E−01 | −8.6757E−01 | 4.7422E−01 | −1.4226E−01 | 1.7848E−02 |
| S10 | 1.9342E−02 | −6.5206E−02 | 8.4876E−02 | −1.1121E−01 | 9.4608E−02 | −5.2068E−02 | 1.7218E−02 | −3.0264E−03 | 2.1545E−04 |
| S11 | 2.1785E−02 | −3.7261E−02 | 2.8105E−02 | −2.2380E−02 | 1.0947E−02 | −3.5595E−03 | 7.3747E−04 | −8.4167E−05 | 3.9414E−06 |
| S12 | −1.0071E−01 | 2.1119E−02 | −4.7803E−03 | 2.5968E−03 | −1.8017E−03 | 5.4528E−04 | −7.7692E−05 | 5.2855E−06 | −1.3925E−07 |
| S13 | −1.0288E−01 | 3.4786E−02 | −1.0151E−02 | 2.1048E−03 | −3.1191E−04 | 3.0060E−05 | −1.7014E−06 | 5.0136E−08 | −5.7989E−10 |

TABLE 15

| f1 (mm) | 18.89  | f6 (mm)  | −7.84 |
|---------|--------|----------|-------|
| f2 (mm) | 4.75   | f(mm)    | 7.01  |
| f3 (mm) | −7.33  | TTL (mm) | 7.05  |
| f4 (mm) | −46.63 | HFOV (°) | 26.6  |
| f5 (mm) | 12.67  |          |       |

Figures 10A, 10B:
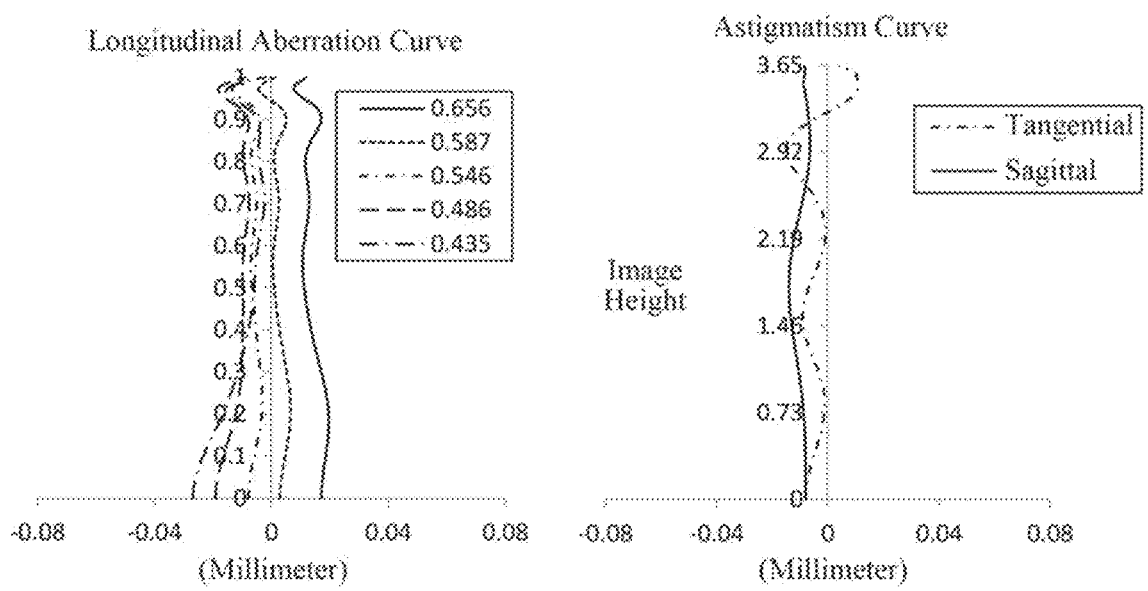
FIGS. 10A to 10D illustrate a longitudinal aberration curve, an astigmatic curve, a distortion curve and a lateral color curve of the camera lens assembly of the Example 5, respectively.
Figure 10C:
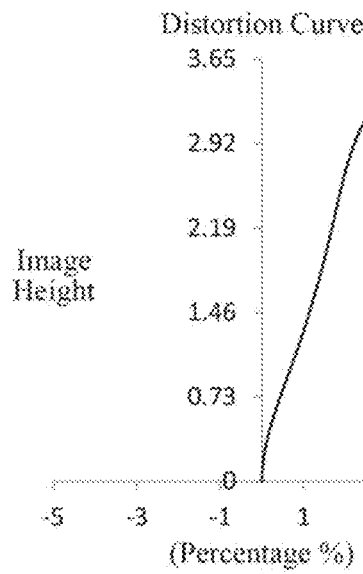
Figure 10D:
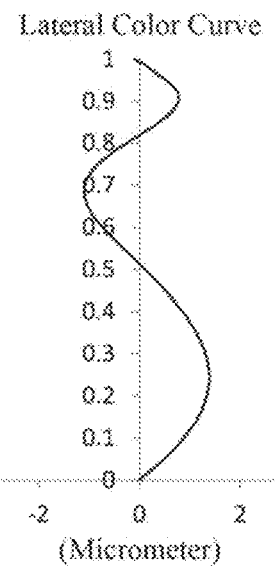

FIG. 10A illustrates a longitudinal aberration curve of the camera lens assembly according to example 5, representing deviations of focal points converged by light of different wavelengths after passing through the camera lens assembly. FIG. 10B illustrates an astigmatism curve of the camera lens assembly according to example 5, representing a curvature of a tangential plane and a curvature of a sagittal plane. FIG. 10C illustrates a distortion curve of the camera lens assembly according to example 5, representing amounts of distortion at different image heights. FIG. 10D illustrates a lateral color curve of the camera lens assembly according to example 5, representing deviations of different image heights on an imaging plane after light passes through the camera lens assembly. It can be seen from FIG. 10A to FIG. 10D that the camera lens assembly provided in example 5 may achieve good image quality.

Example 6

Figure 11:
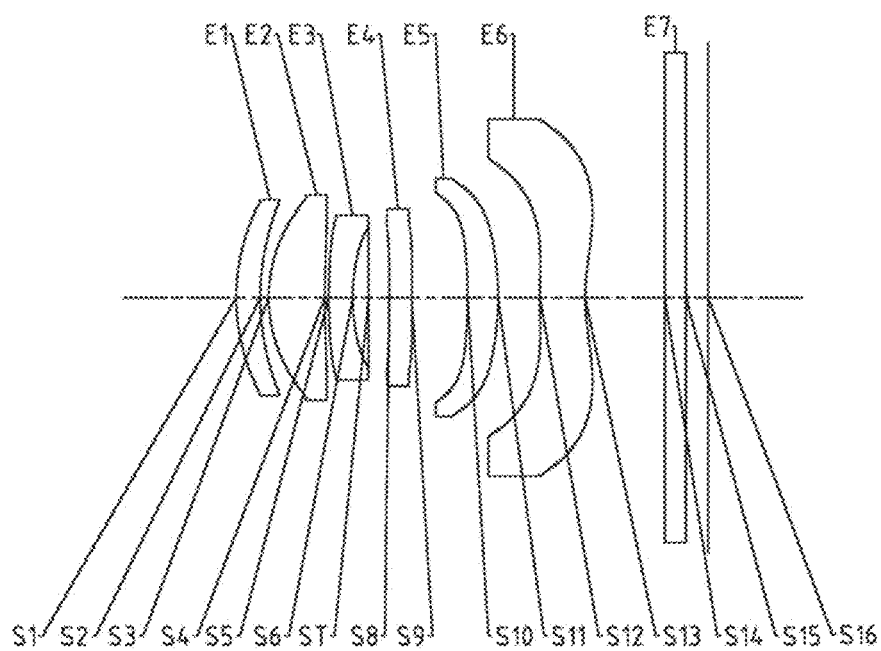
FIG. 11 illustrates a schematic structural view of a camera lens assembly according to Example 6 of the present disclosure.

A camera lens assembly according to example 6 of the present disclosure is described below with reference to FIG. 11 to FIG. 12D. FIG. 11 is a schematic structural view of the camera lens assembly according to example 6 of the present disclosure.

As shown in FIG. 11, the camera lens assembly according to an exemplary embodiment of the present disclosure includes a first lens E1, a second lens E2, a third lens E3, a fourth lens E4, a fifth lens E5, a sixth lens E6, an optical filter E7 and an imaging plane S16, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a negative refractive power. An object-side surface S8 of the fourth lens E4 is a convex surface, and an image-side surface S9 of the fourth lens E4 is a concave surface. The fifth lens E5 has a positive refractive power. An object-side surface S10 of the fifth lens E5 is a concave surface, and an image-side surface S11 of the fifth lens E5 is a convex surface. The sixth lens E6 has a negative refractive power. An object-side surface S12 of the sixth lens E6 is a convex surface, and an image-side surface S13 of the sixth lens E6 is a concave surface. The optical filter E7 has an object-side surface S14 and an image-side surface S15. Light from an object sequentially passes through the respective surfaces S1 to S15 and is finally imaged on the imaging plane S16.

In the camera lens assembly of this example, an aperture diaphragm STO for restricting a light beam may be disposed between the object side and the first lens E1 to improve image quality. Optionally, the camera lens assembly may further include a vignetting diaphragm ST disposed between the third lens E3 and the fourth lens E4.

Table 16 shows surface type, radius of curvature, thickness, material and conic coefficient of each lens of the camera lens assembly in example 6, wherein the units for the radius of curvature and the thickness are millimeter (mm). Table 17 shows high-order coefficients applicable to each aspheric surface in example 6, wherein the surface shape of each aspheric surface may be defined by the formula (1) given in the above example 1. Table 18 shows effective focal lengths f1 to f6 of respective lens, a total effective focal length f of the camera lens assembly, a total track length TTL and half of a maximal field-of-view HFOV in example 6.

TABLE 16

| Surface number | Surface type | Radius of curvature | Thickness | Material | | Conic coefficient |
|---|---|---|---|---|---|---|
| | | | | Refractive index | Abbe number | |
| OBJ | spherical | infinite | infinite | | | |
| S1 (STO) | aspheric | 2.8245 | 0.3428 | 1.55 | 56.1 | 0.0000 |
| S2 | aspheric | 3.5260 | 0.1200 | | | 0.0000 |
| S3 | aspheric | 2.1262 | 0.7975 | 1.55 | 56.1 | −0.1235 |
| S4 | aspheric | 13.4777 | 0.0533 | | | −9.9558 |
| S5 | aspheric | 8.1230 | 0.3420 | 1.67 | 20.4 | 22.6352 |
| S6 | aspheric | 2.9789 | 0.2262 | | | 3.4996 |
| ST | spherical | infinite | 0.2920 | | | |
| S8 | aspheric | 28.6145 | 0.3200 | 1.55 | 56.1 | −96.5757 |
| S9 | aspheric | 19.7433 | 0.7916 | | | 58.3209 |
| S10 | aspheric | −7.9978 | 0.4335 | 1.67 | 20.4 | 19.9000 |
| S11 | aspheric | −4.2273 | 0.5934 | | | 0.0000 |
| S12 | aspheric | 10.6241 | 0.6431 | 1.55 | 56.1 | 23.5909 |
| S13 | aspheric | 2.8468 | 1.1308 | | | −2.9317 |
| S14 | spherical | infinite | 0.3000 | 1.52 | 64.2 | |
| S15 | spherical | infinite | 0.3137 | | | |
| S16 | spherical | infinite | | | | |

TABLE 17

| Surface number | A4 | A6 | A8 | A10 | A12 | A14 | A16 | A18 | A20 |
|---|---|---|---|---|---|---|---|---|---|
| S1 | −4.7212E−03 | −8.0482E−04 | −6.6648E−03 | 1.2648E−02 | −8.4663E−03 | 1.3901E−03 | 1.0479E−03 | −5.3617E−04 | 7.2953E−05 |
| S2 | 2.4737E−03 | −2.2273E−02 | 1.9680E−02 | 1.2842E−02 | −3.5611E−02 | 2.7870E−02 | −1.0690E−02 | 2.0190E−03 | −1.4842E−04 |
| S3 | 9.9697E−03 | −1.9809E−02 | 1.4793E−02 | 2.9977E−02 | −7.6564E−02 | 7.6174E−02 | −4.1892E−02 | 1.2593E−02 | −1.6239E−03 |
| S4 | −3.8795E−02 | 5.6930E−02 | −6.5493E−02 | 1.2463E−01 | −2.3876E−01 | 2.6107E−01 | −1.5559E−01 | 4.8196E−02 | −6.1683E−03 |
| S5 | −3.3208E−02 | 5.1395E−02 | 3.1094E−02 | −1.3336E−01 | 1.3864E−01 | −6.7039E−02 | 1.5715E−02 | −1.6777E−03 | 0.0000E+00 |
| S6 | −5.3102E−03 | 2.8562E−02 | −6.3867E−03 | 2.9058E−02 | −8.1788E−02 | 5.4409E−02 | 7.0812E−02 | −1.0297E−01 | 3.4993E−02 |
| S8 | −6.2708E−02 | −1.7318E−02 | 1.0102E−01 | −2.6409E−01 | 4.9711E−01 | −5.9050E−01 | 4.3420E−01 | −1.7504E−01 | 2.9100E−02 |
| S9 | −5.6125E−02 | −3.1456E−02 | 1.2018E−01 | −2.7987E−01 | 4.3603E−01 | −4.2043E−01 | 2.4564E−01 | −7.8471E−02 | 1.0426E−02 |
| S10 | 1.6675E−02 | −5.8633E−02 | 7.9544E−02 | −1.0752E−01 | 9.0873E−02 | −4.9619E−02 | 1.6372E−02 | −2.8798E−03 | 2.0532E−04 |
| S11 | 1.4492E−02 | −2.8145E−02 | 2.5315E−02 | −2.3283E−02 | 1.1665E−02 | −3.6495E−03 | 7.1326E−04 | −7.7265E−05 | 3.4741E−06 |
| S12 | −1.0338E−01 | 2.3818E−02 | −3.4504E−03 | 5.1720E−04 | −7.0061E−04 | 2.6377E−04 | −4.0412E−05 | 2.8143E−06 | −7.4276E−08 |
| S13 | −9.5773E−02 | 3.3241E−02 | −9.6410E−03 | 1.9340E−03 | −2.6526E−04 | 2.2899E−05 | −1.1390E−06 | 2.8857E−08 | −2.7425E−10 |

TABLE 18

| f1 (mm) | 22.15 | f6 (mm) | −7.33 |
|---|---|---|---|
| f2 (mm) | 4.51 | f (mm) | 6.45 |
| f3 (mm) | −7.23 | TTL (mm) | 6.70 |
| f4 (mm) | −118.03 | HFOV (°) | 28.6 |
| f5 (mm) | 12.83 | | |

Figure 12A:
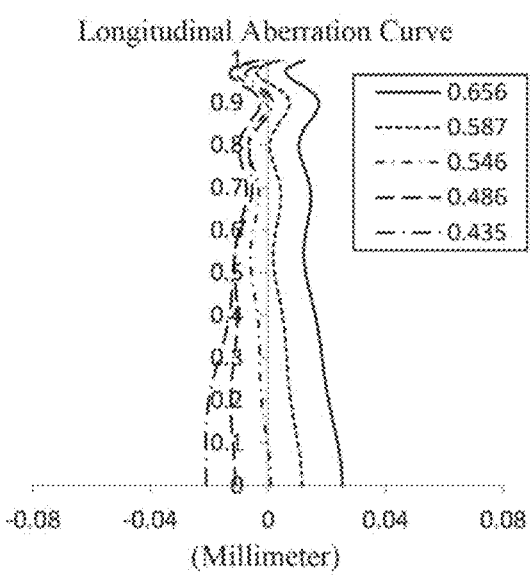
FIGS. 12A to 12D illustrate a longitudinal aberration curve, an astigmatic curve, a distortion curve and a lateral color curve of the camera lens assembly of the Example 6, respectively.
Figure 12B:
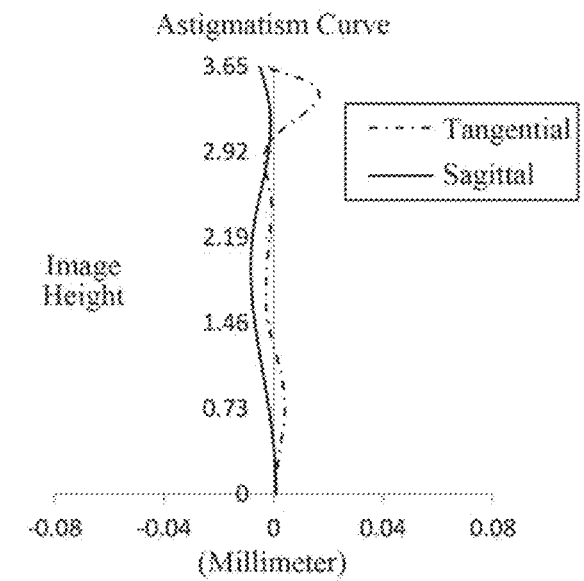
Figure 12C:
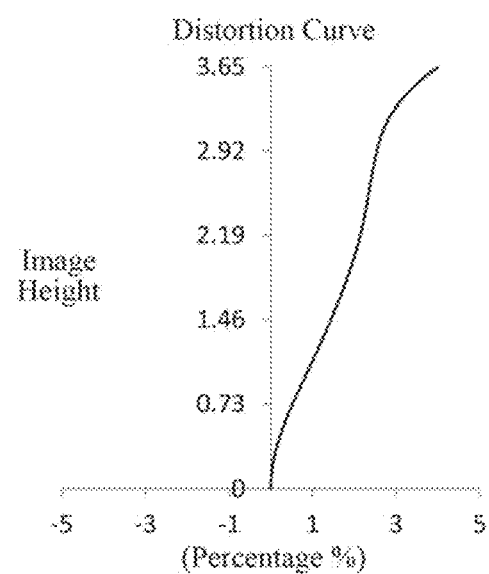
Figure 12D:
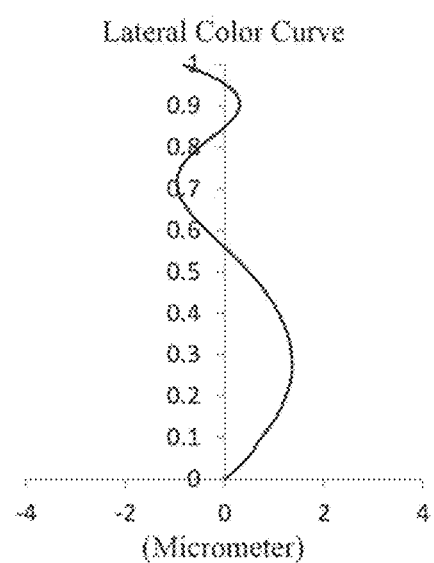

FIG. 12A illustrates a longitudinal aberration curve of the camera lens assembly according to example 6, representing deviations of focal points converged by light of different wavelengths after passing through the camera lens assembly. FIG. 12B illustrates an astigmatism curve of the camera lens assembly according to example 6, representing a curvature of a tangential plane and a curvature of a sagittal plane. FIG. 12C illustrates a distortion curve of the camera lens assembly according to example 6, representing amounts of distortion at different image heights. FIG. 12D illustrates a lateral color curve of the camera lens assembly according to example 6, representing deviations of different image heights on an imaging plane after light passes through the camera lens assembly. It can be seen from FIG. 12A to FIG. 12D that the camera lens assembly provided in example 6 may achieve good image quality.

Example 7

Figure 13:
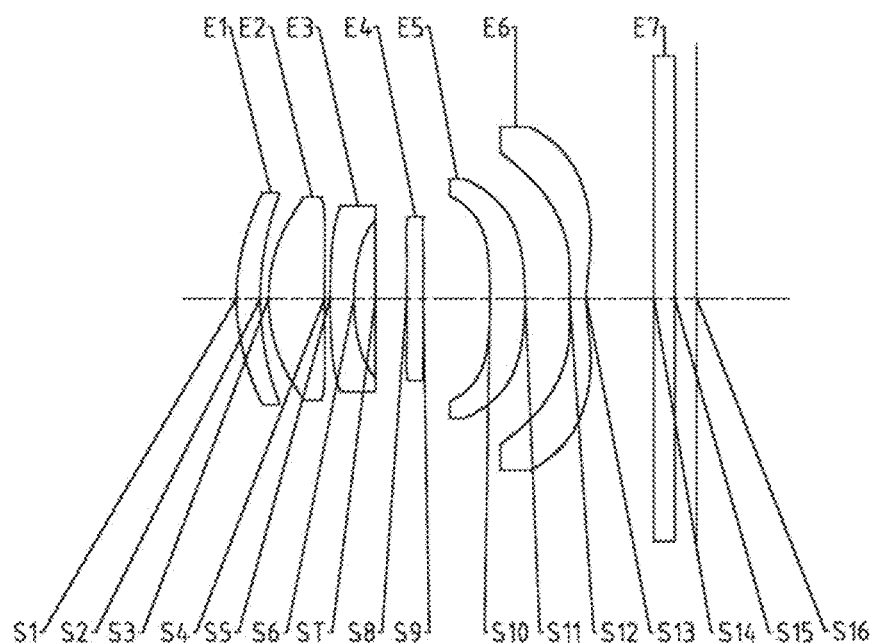
FIG. 13 illustrates a schematic structural view of a camera lens assembly according to Example 7 of the present disclosure.

A camera lens assembly according to example 7 of the present disclosure is described below with reference to FIG. 13 to FIG. 14D. FIG. 13 is a schematic structural view of the camera lens assembly according to example 7 of the present disclosure.

As shown in FIG. 13, the camera lens assembly according to an exemplary embodiment of the present disclosure includes a first lens E1, a second lens E2, a third lens E3, a fourth lens E4, a fifth lens E5, a sixth lens E6, an optical filter E7 and an imaging plane S16, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S8 of the fourth lens E4 is a convex surface, and an image-side surface S9 of the fourth lens E4 is a concave surface. The fifth lens E5 has a positive refractive power. An object-side surface S10 of the fifth lens E5 is a concave surface, and an image-side surface S11 of the fifth lens E5 is a convex surface. The sixth lens E6 has a negative refractive power. An object-side surface S12 of the sixth lens E6 is a convex surface, and an image-side surface S13 of the sixth lens E6 is a concave surface. The optical filter E7 has an object-side surface S14 and an image-side surface S15. Light from an object sequentially passes through the respective surfaces S1 to S15 and is finally imaged on the imaging plane S16.

In the camera lens assembly of this example, an aperture diaphragm STO for restricting a light beam may be disposed between the object side and the first lens E1 to improve image quality. Optionally, the camera lens assembly may further include a vignetting diaphragm ST disposed between the third lens E3 and the fourth lens E4.

Table 19 shows surface type, radius of curvature, thickness, material and conic coefficient of each lens of the camera lens assembly in example 7, wherein the units for the radius of curvature and the thickness are millimeter (mm). Table 20 shows high-order coefficients applicable to each aspheric surface in example 7, wherein the surface shape of each aspheric surface may be defined by the formula (1) given in the above example 1. Table 21 shows effective focal lengths f1 to f6 of respective lens, a total effective focal length f of the camera lens assembly, a total track length TTL and half of a maximal field-of-view HFOV in example 7.

TABLE 19

| | | | | Material | | |
|---|---|---|---|---|---|---|
| Surface number | Surface type | Radius of curvature | Thickness | Refractive index | Abbe number | Conic coefficient |
| OBJ | spherical | infinite | infinite | | | |
| S1 (STO) | aspheric | 2.8867 | 0.3428 | 1.55 | 56.1 | 0.0000 |
| S2 | aspheric | 4.0056 | 0.1200 | | | 0.0000 |
| S3 | aspheric | 2.3492 | 0.8019 | 1.55 | 56.1 | −0.0238 |

TABLE 19-continued

| Surface number | Surface type | Radius of curvature | Thickness | Material Refractive index | Abbe number | Conic coefficient |
|---|---|---|---|---|---|---|
| S4 | aspheric | 29.0000 | 0.0794 | | | 30.4640 |
| S5 | aspheric | 10.1688 | 0.3420 | 1.67 | 20.4 | 26.5021 |
| S6 | aspheric | 3.0973 | 0.3063 | | | 3.5249 |
| ST | spherical | infinite | 0.4490 | | | |
| S8 | aspheric | 13.5935 | 0.2375 | 1.55 | 56.1 | 58.3798 |
| S9 | aspheric | 13.5306 | 0.9583 | | | 99.0000 |
| S10 | aspheric | −9.2421 | 0.5031 | 1.67 | 20.4 | 31.8577 |
| S11 | aspheric | −4.3464 | 0.6382 | | | 0.0000 |
| S12 | aspheric | 11.7275 | 0.2382 | 1.55 | 56.1 | 24.8736 |
| S13 | aspheric | 2.3361 | 0.9697 | | | −13.6528 |
| S14 | spherical | infinite | 0.3000 | 1.52 | 64.2 | |
| S15 | spherical | infinite | 0.3137 | | | |
| S16 | spherical | infinite | | | | |

TABLE 20

| Surface number | A4 | A6 | A8 | A10 | A12 | A14 | A16 | A18 | A20 |
|---|---|---|---|---|---|---|---|---|---|
| S1 | −7.7064E−03 | −2.0985E−02 | 4.1162E−02 | −5.0015E−02 | 3.9821E−02 | −2.0370E−02 | 6.5429E−03 | −1.2150E−03 | 9.8471E−05 |
| S2 | 1.7609E−03 | −8.0174E−02 | 2.1402E−01 | −3.1601E−01 | 2.9518E−01 | −1.7604E−01 | 6.5258E−02 | −1.3738E−02 | 1.2503E−03 |
| S3 | 1.1884E−02 | −6.5454E−02 | 1.9409E−01 | −3.1801E−01 | 3.2631E−01 | −2.1431E−01 | 8.7128E−02 | −1.9839E−02 | 1.9026E−03 |
| S4 | −3.6068E−02 | 4.5398E−02 | −2.6959E−03 | −6.7545E−02 | 7.3381E−02 | −2.6988E−02 | −1.4338E−03 | 3.0867E−03 | −5.2483E−04 |
| S5 | −3.4603E−02 | 5.0170E−02 | 8.2024E−02 | −2.7003E−01 | 3.1763E−01 | −1.9078E−01 | 5.7824E−02 | −6.9931E−03 | 0.0000E+00 |
| S6 | −1.8533E−02 | 9.0708E−02 | −2.9446E−01 | 1.0304E+00 | −2.2208E+00 | 2.8664E+00 | −2.1651E+00 | 8.4411E−01 | −1.5101E−01 |
| S8 | −9.7428E−02 | 7.9040E−02 | −2.1929E−01 | 7.4537E−01 | −1.4733E+00 | 1.8122E+00 | −1.3443E+00 | 5.4948E−01 | −9.5146E−02 |
| S9 | −9.8766E−02 | 4.8952E−02 | −5.6607E−02 | 1.5178E−01 | −2.2688E−01 | 2.1961E−01 | −1.2867E−01 | 4.1252E−02 | −5.5901E−03 |
| S10 | −1.7164E−02 | −6.6507E−02 | 6.1465E−02 | −5.1453E−02 | 3.1127E−02 | −1.4905E−02 | 4.7543E−03 | −7.9624E−04 | 5.1325E−05 |
| S11 | 7.7467E−03 | −6.4993E−02 | 5.4764E−02 | −3.5824E−02 | 1.6554E−02 | −5.6175E−03 | 1.2506E−03 | −1.5291E−04 | 7.6159E−06 |
| S12 | −2.1390E−01 | 9.5417E−02 | −2.4395E−02 | 3.3849E−03 | −6.7107E−04 | 2.0778E−04 | −3.4559E−05 | 2.6240E−06 | −7.4453E−08 |
| S13 | −1.3788E−01 | 6.6863E−02 | −2.0785E−02 | 4.0377E−03 | −5.0761E−04 | 3.9282E−05 | −1.7320E−06 | 3.7892E−08 | −2.8392E−10 |

TABLE 21

| | | | |
|---|---|---|---|
| f1 (mm) | 17.06 | f6 (mm) | −5.39 |
| f2 (mm) | 4.63 | f (mm) | 6.70 |
| f3 (mm) | −6.80 | TTL (mm) | 6.60 |
| f4 (mm) | 15936.18 | HFOV (°) | 28.1 |
| f5 (mm) | 11.79 | | |

Figure 14A:
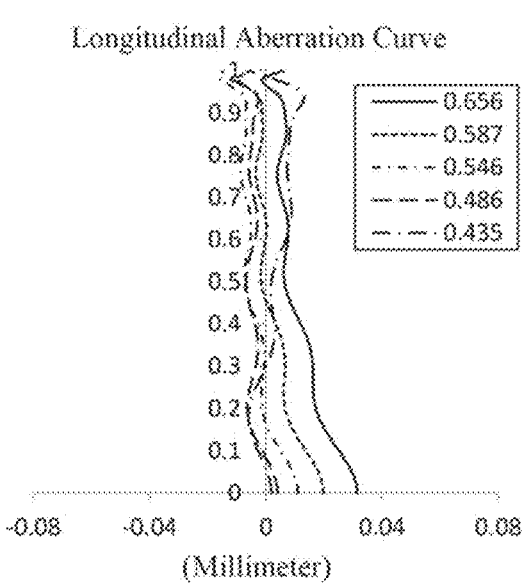
FIGS. 14A to 14D illustrate a longitudinal aberration curve, an astigmatic curve, a distortion curve and a lateral color curve of the camera lens assembly of the Example 7, respectively.
Figure 14B:
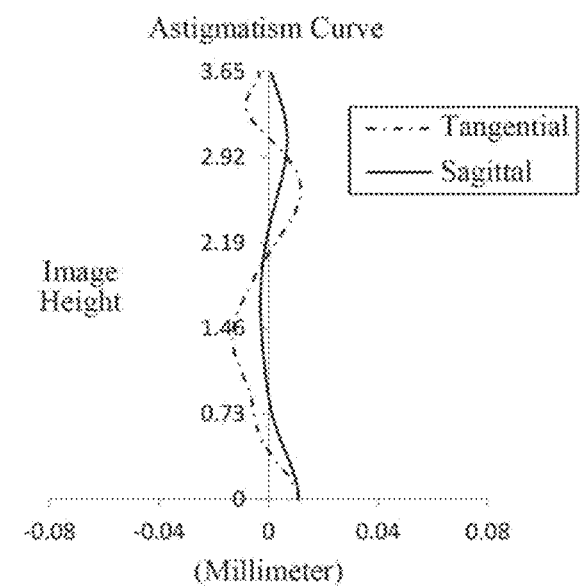
Figure 14C:
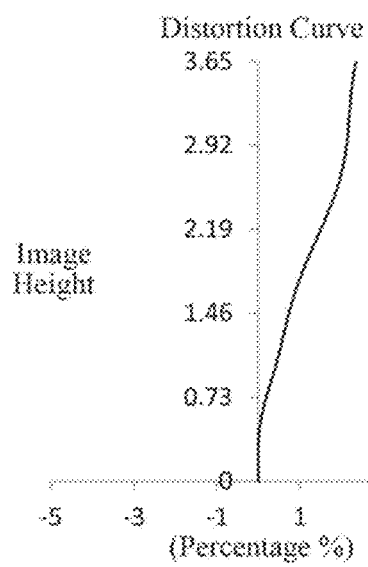
Figure 14D:
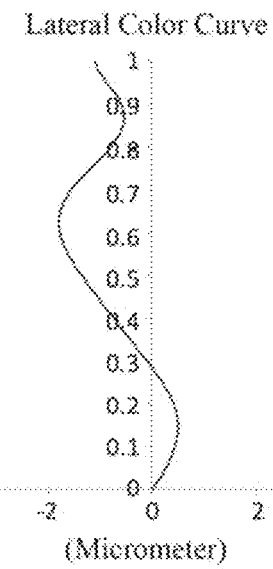

FIG. 14A illustrates a longitudinal aberration curve of the camera lens assembly according to example 7, representing deviations of focal points converged by light of different wavelengths after passing through the camera lens assembly. FIG. 14B illustrates an astigmatism curve of the camera lens assembly according to example 7, representing a curvature of a tangential plane and a curvature of a sagittal plane. FIG. 14C illustrates a distortion curve of the camera lens assembly according to example 7, representing amounts of distortion at different image heights. FIG. 14D illustrates a lateral color curve of the camera lens assembly according to example 7, representing deviations of different image heights on an imaging plane after light passes through the camera lens assembly. It can be seen from FIG. 14A to FIG. 14D that the camera lens assembly provided in example 7 may achieve good image quality.

Example 8

Figure 15:
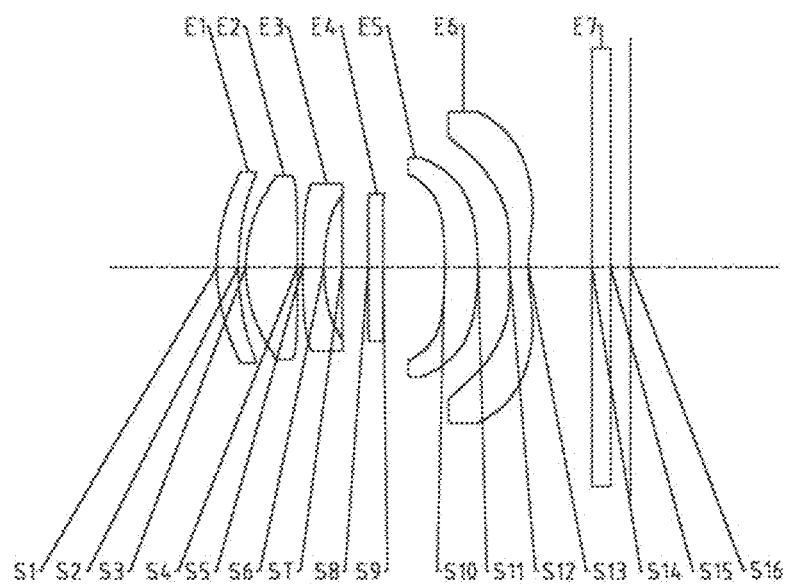
FIG. 15 illustrates a schematic structural view of a camera lens assembly according to Example 8 of the present disclosure.

A camera lens assembly according to example 8 of the present disclosure is described below with reference to FIG. 15 to FIG. 16D. FIG. 15 is a schematic structural view of the camera lens assembly according to example 8 of the present disclosure.

As shown in FIG. 15, the camera lens assembly according to an exemplary embodiment of the present disclosure includes a first lens E1, a second lens E2, a third lens E3, a fourth lens E4, a fifth lens E5, a sixth lens E6, an optical filter E7 and an imaging plane S16, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a convex surface. The third lens E3 has a negative refractive power. An object-side surface S5 of the third lens E3 is a convex surface, and an image-side surface S6 of the third lens E3 is a concave surface. The fourth lens E4 has a negative refractive power. An object-side surface S8 of the fourth lens E4 is a convex surface, and an image-side surface S9 of the fourth lens E4 is a concave surface. The fifth lens E5 has a positive refractive power. An object-side surface S10 of the fifth lens E5 is a concave surface, and an image-side surface S11 of the fifth lens E5 is a convex surface. The sixth lens E6 has a negative refractive power. An object-side surface S12 of the sixth lens E6 is a convex surface, and an image-side surface S13 of the sixth lens E6 is a concave surface. The optical filter E7 has an object-side surface S14 and an image-side surface S15. Light from an object sequentially passes through the respective surfaces S1 to S15 and is finally imaged on the imaging plane S16.

In the camera lens assembly of this example, an aperture diaphragm STO for restricting a light beam may be disposed between the object side and the first lens E1 to improve image quality. Optionally, the camera lens assembly may further include a vignetting diaphragm ST disposed between the third lens E3 and the fourth lens E4.

Table 22 shows surface type, radius of curvature, thickness, material and conic coefficient of each lens of the camera lens assembly in example 8, wherein the units for the radius of curvature and the thickness are millimeter (mm). Table 23 shows high-order coefficients applicable to each aspheric surface in example 8, wherein the surface shape of each aspheric surface may be defined by the formula (1) given in the above example 1. Table 24 shows effective focal lengths f1 to f6 of respective lens, a total effective focal length f of the camera lens assembly, a total track length TTL and half of a maximal field-of-view HFOV in example 8.

assembly according to example 8, representing a curvature of a tangential plane and a curvature of a sagittal plane. FIG. 16C illustrates a distortion curve of the camera lens assembly according to example 8, representing amounts of distortion at different image heights. FIG. 16D illustrates a lateral color curve of the camera lens assembly according to example 8, representing deviations of different image heights on an imaging plane after light passes through the camera lens assembly. It can be seen from FIG. 16A to FIG. 16D that the camera lens assembly provided in example 8 may achieve good image quality.

Example 9

A camera lens assembly according to example 9 of the present disclosure is described below with reference to FIG.

TABLE 22

| Surface number | Surface type | Radius of curvature | Thickness | Material | | Conic coefficient |
|---|---|---|---|---|---|---|
| | | | | Refractive index | Abbe number | |
| OBJ | spherical | infinite | infinite | | | |
| S1 (STO) | aspheric | 2.8534 | 0.3428 | 1.55 | 56.1 | 0.0000 |
| S2 | aspheric | 3.9578 | 0.1200 | | | 0.0000 |
| S3 | aspheric | 2.4469 | 0.8268 | 1.55 | 56.1 | −0.0001 |
| S4 | aspheric | −1301.3061 | 0.0799 | | | −99.0000 |
| S5 | aspheric | 12.3054 | 0.3420 | 1.67 | 20.4 | 33.4728 |
| S6 | aspheric | 3.2463 | 0.2916 | | | 3.4151 |
| ST | spherical | infinite | 0.4089 | | | |
| S8 | aspheric | 13.5935 | 0.2375 | 1.55 | 56.1 | 85.2317 |
| S9 | aspheric | 12.5521 | 0.9870 | | | 97.6217 |
| S10 | aspheric | −10.2901 | 0.5303 | 1.67 | 20.4 | 43.0769 |
| S11 | aspheric | −4.7805 | 0.5042 | | | 0.0000 |
| S12 | aspheric | 11.0078 | 0.3000 | 1.55 | 56.1 | 24.3616 |
| S13 | aspheric | 2.3131 | 1.0153 | | | −13.9096 |
| S14 | spherical | infinite | 0.3000 | 1.52 | 64.2 | |
| S15 | spherical | infinite | 0.3137 | | | |
| S16 | spherical | infinite | | | | |

TABLE 23

| Sur. No. | A4 | A6 | A8 | A10 | A12 | A14 | A16 | A18 | A20 |
|---|---|---|---|---|---|---|---|---|---|
| S1 | −8.7163E−03 | −1.7572E−02 | 2.3512E−02 | −1.5363E−02 | 4.1748E−03 | 7.6063E−04 | −7.3937E−04 | 1.4342E−04 | −7.8342E−06 |
| S2 | 1.7385E−03 | −8.0027E−02 | 1.9387E−01 | −2.5435E−01 | 2.1644E−01 | −1.2224E−01 | 4.4683E−02 | −9.5843E−03 | 9.0488E−04 |
| S3 | 1.0951E−02 | −6.2759E−02 | 1.6523E−01 | −2.3384E−01 | 2.1174E−01 | −1.2777E−01 | 4.9622E−02 | −1.1065E−02 | 1.0418E−03 |
| S4 | −3.4647E−02 | 4.4348E−02 | −3.0386E−03 | −6.4314E−02 | 6.9944E−02 | −2.5875E−02 | −1.0254E−03 | 2.7511E−03 | −4.6811E−04 |
| S5 | −3.4289E−02 | 5.0703E−02 | 8.9246E−02 | −2.9702E−01 | 3.5935E−01 | −2.2221E−01 | 6.9496E−02 | −8.7127E−03 | 0.0000E+00 |
| S6 | −2.2395E−02 | 9.0826E−02 | −2.8225E−01 | 1.0085E+00 | −2.2454E+00 | 2.9891E+00 | −2.3147E+00 | 9.6342E−01 | −1.6684E−01 |
| S8 | −9.8412E−02 | 8.7295E−02 | −2.4127E−01 | 8.4262E−01 | −1.7408E+00 | 2.2358E+00 | −1.7262E+00 | 7.3145E−01 | −1.3072E−01 |
| S9 | −9.8101E−02 | 6.8601E−02 | −1.1026E−01 | 2.6646E−01 | −3.9246E−01 | 3.7390E−01 | −2.1634E−01 | 6.8065E−02 | −8.8982E−03 |
| S10 | −1.7158E−02 | −6.6558E−02 | 7.1809E−02 | −7.0595E−02 | 4.9518E−02 | −2.5188E−02 | 7.9543E−03 | −1.3041E−03 | 8.3237E−05 |
| S11 | 3.5358E−03 | −6.7382E−02 | 6.7102E−02 | −4.9816E−02 | 2.5319E−02 | −8.9128E−03 | 1.9699E−03 | −2.3611E−04 | 1.1545E−05 |
| S12 | −2.1765E−01 | 9.4650E−02 | −2.1530E−02 | 1.4397E−03 | −8.6483E−05 | 1.1804E−04 | −2.7413E−05 | 2.3590E−06 | −7.1421E−08 |
| S13 | −1.3283E−01 | 6.4626E−02 | −2.0378E−02 | 4.0344E−03 | −5.1070E−04 | 3.8524E−05 | −1.5614E−06 | 2.7062E−08 | −5.5533E−11 |

TABLE 24

| f1 (mm) | 16.86 | f6 (mm) | −5.42 |
|---|---|---|---|
| f2 (mm) | 4.47 | f (mm) | 6.70 |
| f3 (mm) | −6.70 | TTL (mm) | 6.60 |
| f4 (mm) | −326.10 | HFOV (°) | 28.0 |
| f5 (mm) | 12.87 | | |

Figure 16A:
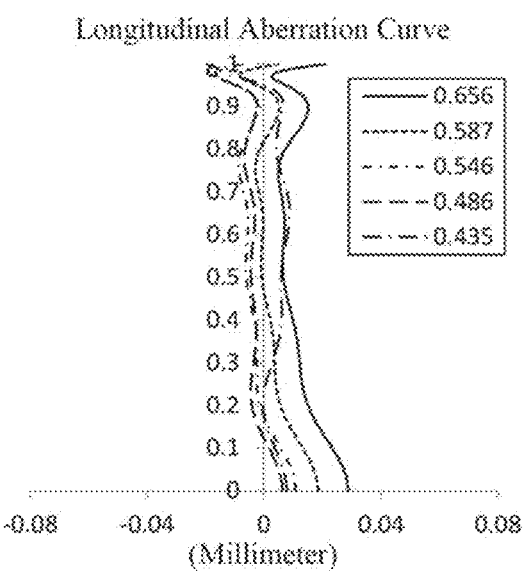
FIGS. 16A to 16D illustrate a longitudinal aberration curve, an astigmatic curve, a distortion curve and a lateral color curve of the camera lens assembly of the Example 8, respectively.
Figure 16B:
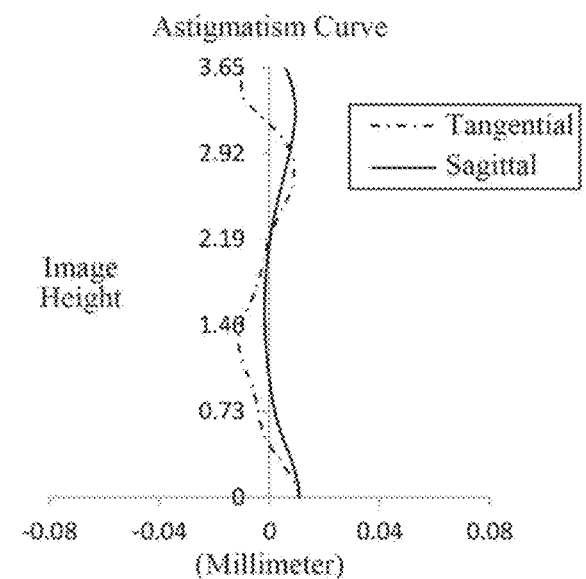
Figure 16C:
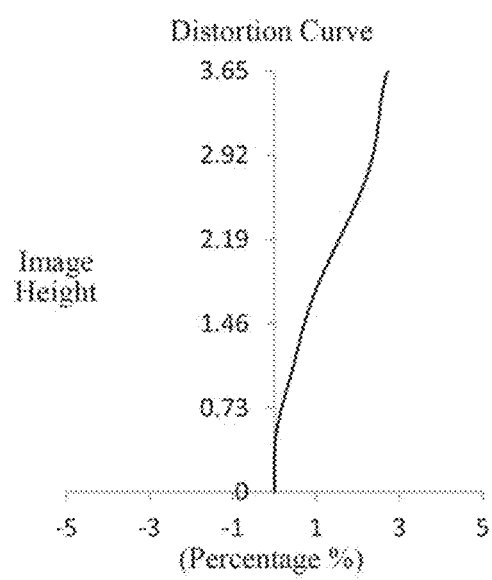
Figure 16D:
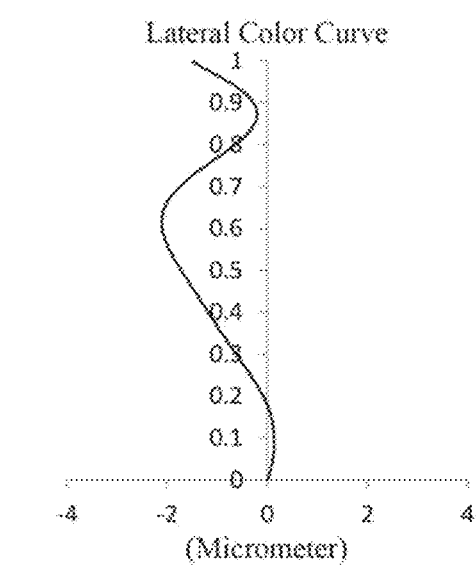
Figure 17:
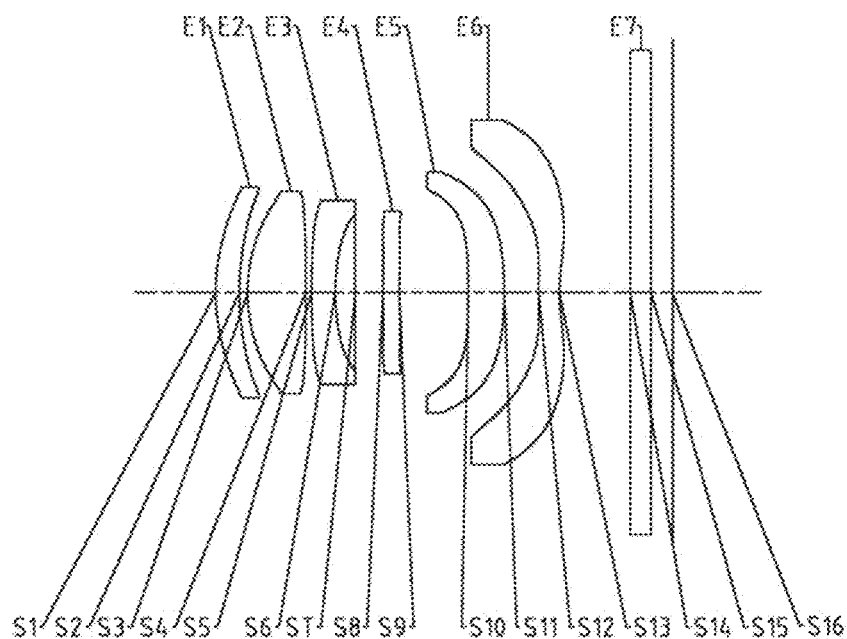
FIG. 17 illustrates a schematic structural view of a camera lens assembly according to Example 9 of the present disclosure.

FIG. 16A illustrates a longitudinal aberration curve of the camera lens assembly according to example 8, representing deviations of focal points converged by light of different wavelengths after passing through the camera lens assembly. FIG. 16B illustrates an astigmatism curve of the camera lens 17 to FIG. 18D. FIG. 17 is a schematic structural view of the camera lens assembly according to example 9 of the present disclosure.

As shown in FIG. 17, the camera lens assembly according to an exemplary embodiment of the present disclosure includes a first lens E1, a second lens E2, a third lens E3, a fourth lens E4, a fifth lens E5, a sixth lens E6, an optical filter E7 and an imaging plane S16, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a positive refractive power.

An object-side surface S3 of the second lens E2 is a convex surface, and an image-side surface S4 of the second lens E2 is a convex surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S8 of the fourth lens E4 is a convex surface, and an image-side surface S9 of the fourth lens E4 is a concave surface. The fifth lens E5 has a positive refractive power. An object-side surface S10 of the fifth lens E5 is a concave surface, and an image-side surface S11 of the fifth lens E5 is a convex surface. The sixth lens E6 has a negative refractive power. An object-side surface S12 of the sixth lens E6 is a convex surface, and an image-side surface S13 of the sixth lens E6 is a concave surface. The optical filter E7 has an object-side surface S14 and an image-side surface S15. Light from an object sequentially passes through the respective surfaces S1 to S15 and is finally imaged on the imaging plane S16.

In the camera lens assembly of this example, an aperture diaphragm STO for restricting a light beam may be disposed between the object side and the first lens E1 to improve image quality. Optionally, the camera lens assembly may further include a vignetting diaphragm ST disposed between the third lens E3 and the fourth lens E4.

Table 25 shows surface type, radius of curvature, thickness, material and conic coefficient of each lens of the camera lens assembly in example 9, wherein the units for the radius of curvature and the thickness are millimeter (mm). Table 26 shows high-order coefficients applicable to each aspheric surface in example 9, wherein the surface shape of each aspheric surface may be defined by the formula (1) given in the above example 1. Table 27 shows effective focal lengths f1 to f6 of respective lens, a total effective focal length f of the camera lens assembly, a total track length TTL and half of a maximal field-of-view HFOV in example 9.

TABLE 25

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 (STO) | aspheric | 2.8397 | 0.3428 | 1.55 | 56.1 | 0.0000 |
| S2 | aspheric | 3.9176 | 0.1200 | | | 0.0000 |
| S3 | aspheric | 2.4518 | 0.8387 | 1.55 | 56.1 | 0.0167 |
| S4 | aspheric | −200.0000 | 0.0853 | | | −99.0000 |
| S5 | aspheric | 13.2789 | 0.3420 | 1.67 | 20.4 | 35.1386 |
| S6 | aspheric | 3.2794 | 0.2854 | | | 3.3993 |
| ST | spherical | infinite | 0.4024 | | | |
| S8 | aspheric | 13.5935 | 0.2375 | 1.55 | 56.1 | 88.7350 |
| S9 | aspheric | 12.4699 | 0.9967 | | | 97.4196 |
| S10 | aspheric | −10.6660 | 0.5182 | 1.67 | 20.4 | 43.3904 |
| S11 | aspheric | −4.8688 | 0.4950 | | | 0.0000 |
| S12 | aspheric | 11.0298 | 0.3000 | 1.55 | 56.1 | 23.9440 |
| S13 | aspheric | 2.3399 | 1.0224 | | | −14.1796 |
| S14 | spherical | infinite | 0.3000 | 1.52 | 64.2 | |
| S15 | spherical | infinite | 0.3137 | | | |
| S16 | spherical | infinite | | | | |

TABLE 26

| Surface number | A4 | A6 | A8 | A10 | A12 | A14 | A16 | A18 | A20 |
|---|---|---|---|---|---|---|---|---|---|
| S1 | −9.4030E−03 | −1.5071E−02 | 1.8818E−02 | −1.1005E−02 | 2.3323E−03 | 7.7412E−04 | −4.4140E−04 | 3.5936E−05 | 4.6517E−06 |
| S2 | 1.3573E−03 | −7.8119E−02 | 1.8791E−01 | −2.4438E−01 | 2.0708E−01 | −1.1700E−01 | 4.2931E−02 | −9.2598E−03 | 8.7933E−04 |
| S3 | 1.0786E−02 | −6.2882E−02 | 1.6317E−01 | −2.2551E−01 | 1.9915E−01 | −1.1747E−01 | 4.4764E−02 | −9.8252E−03 | 9.1017E−04 |
| S4 | −3.4332E−02 | 4.4079E−02 | −3.0053E−03 | −6.3980E−02 | 6.9775E−02 | −2.6114E−02 | −7.1114E−04 | 2.6219E−03 | −4.4993E−04 |
| S5 | −3.3976E−02 | 5.0165E−02 | 8.9450E−02 | −2.9579E−01 | 3.5696E−01 | −2.2025E−01 | 6.8770E−02 | −8.6182E−03 | 0.0000E+00 |
| S6 | −2.3344E−02 | 9.2273E−02 | −2.8524E−01 | 1.0105E+00 | −2.2339E+00 | 2.9590E+00 | −2.2840E+00 | 9.4906E−01 | −1.6437E−01 |
| S8 | −9.5738E−02 | 7.1380E−02 | −1.9140E−01 | 7.5794E−01 | −1.6660E+00 | 2.2219E+00 | −1.7596E+00 | 7.5966E−01 | −1.3784E−01 |
| S9 | −9.3307E−02 | 4.7610E−02 | −3.4040E−02 | 9.3504E−02 | −1.3162E−01 | 1.1707E−01 | −5.8861E−02 | 1.3741E−02 | −9.0524E−04 |
| S10 | −1.8019E−02 | −7.2914E−02 | 8.7173E−02 | −9.1996E−02 | 6.7592E−02 | −3.4395E−02 | 1.0662E−02 | −1.7224E−03 | 1.0929E−04 |
| S11 | −1.0473E−03 | −6.9157E−02 | 7.3436E−02 | −5.7220E−02 | 3.0449E−02 | −1.1074E−02 | 2.4941E−03 | −3.0258E−04 | 1.4944E−05 |
| S12 | −2.2409E−01 | 9.5105E−02 | −1.7741E−02 | −8.7567E−04 | 5.7216E−04 | 1.2151E−05 | −1.7586E−05 | 1.8685E−06 | −6.1232E−08 |
| S13 | −1.3687E−01 | 6.7035E−02 | −2.0620E−02 | 3.9112E−03 | −4.6689E−04 | 3.2255E−05 | −1.0963E−06 | 9.4727E−09 | 2.1247E−10 |

TABLE 27

| f1 (mm) | 16.98 | f6 (mm) | −5.50 |
|---|---|---|---|
| f2 (mm) | 4.44 | f (mm) | 6.70 |
| f3 (mm) | 3.00 | TTL (mm) | 6.60 |
| f4 (mm) | −298.35 | HFOV (°) | 28.0 |
| f5 (mm) | 12.94 | | |

Figures 18A, 18B:
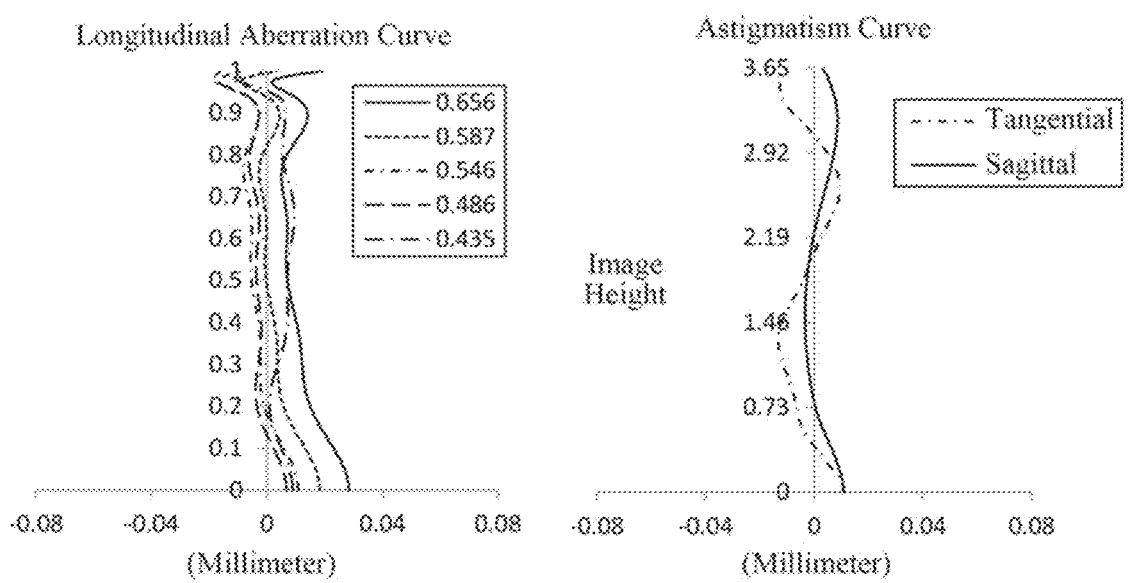
FIGS. 18A to 18D illustrate a longitudinal aberration curve, an astigmatic curve, a distortion curve and a lateral color curve of the camera lens assembly of the Example 9, respectively.
Figure 18C:
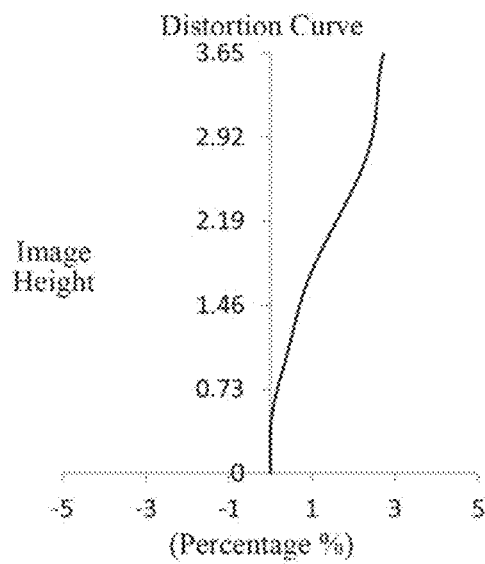
Figure 18D:
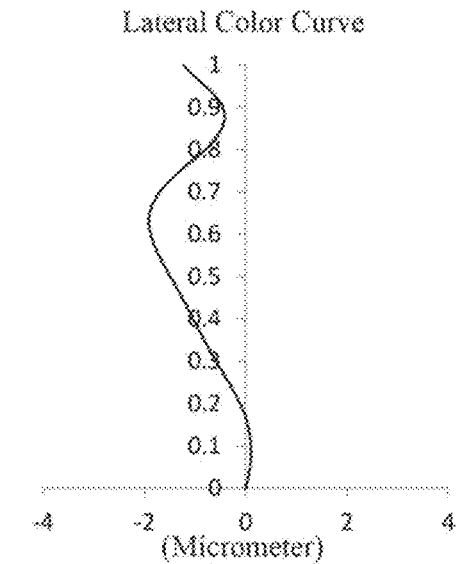

FIG. 18A illustrates a longitudinal aberration curve of the camera lens assembly according to example 9, representing deviations of focal points converged by light of different wavelengths after passing through the camera lens assembly. FIG. 18B illustrates an astigmatism curve of the camera lens assembly according to example 9, representing a curvature of a tangential plane and a curvature of a sagittal plane. FIG. 18C illustrates a distortion curve of the camera lens assembly according to example 9, representing amounts of distortion at different image heights. FIG. 18D illustrates a lateral color curve of the camera lens assembly according to example 9, representing deviations of different image heights on an imaging plane after light passes through the camera lens assembly. It can be seen from FIG. 18A to FIG. 18D that the camera lens assembly provided in example 9 may achieve good image quality.

Example 10

Figure 19:
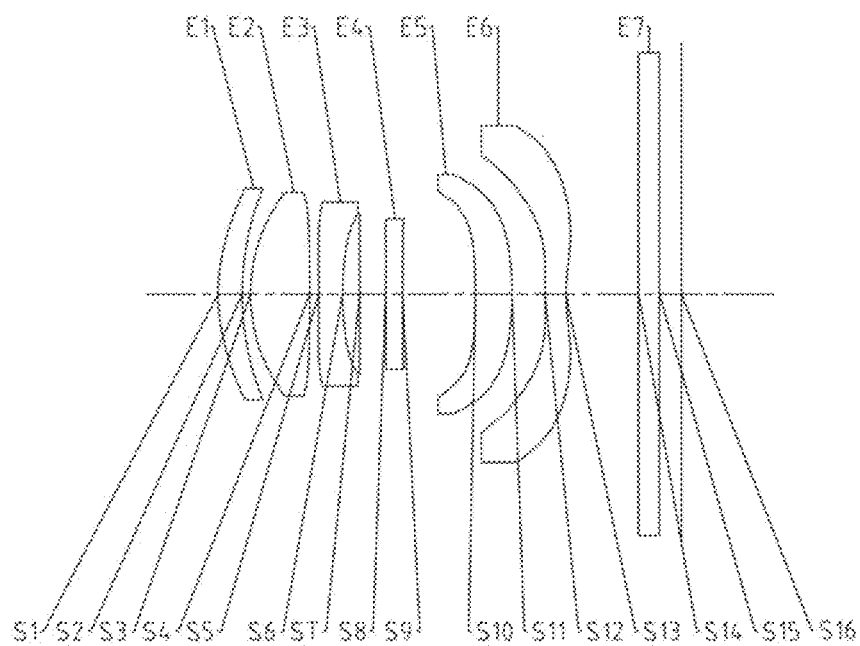
FIG. 19 illustrates a schematic structural view of a camera lens assembly according to Example 10 of the present disclosure.

A camera lens assembly according to example 10 of the present disclosure is described below with reference to FIG. 19 to FIG. 20D. FIG. 19 is a schematic structural view of the camera lens assembly according to example 10 of the present disclosure.

As shown in FIG. 19, the camera lens assembly according to an exemplary embodiment of the present disclosure includes a first lens E1, a second lens E2, a third lens E3, a fourth lens E4, a fifth lens E5, a sixth lens E6, an optical filter E7 and an imaging plane S16, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a convex surface. The third lens E3 has a negative refractive power. An object-side surface S5 of the third lens E3 is a concave surface, and an image-side surface S6 of the third lens E3 is a concave surface. The fourth lens E4 has a negative refractive power. An object-side surface S8 of the fourth lens E4 is a convex surface, and an image-side surface S9 of the fourth lens E4 is a concave surface. The fifth lens E5 has a positive refractive power. An object-side surface S10 of the fifth lens E5 is a concave surface, and an image-side surface S11 of the fifth lens E5 is a convex surface. The sixth lens E6 has a negative refractive power. An object-side surface S12 of the sixth lens E6 is a convex surface, and an image-side surface S13 of the sixth lens E6 is a concave surface. The optical filter E7 has an object-side surface S14 and an image-side surface S15. Light from an object sequentially passes through the respective surfaces S1 to S15 and is finally imaged on the imaging plane S16.

In the camera lens assembly of this example, an aperture diaphragm STO for restricting a light beam may be disposed between the object side and the first lens E1 to improve image quality. Optionally, the camera lens assembly may further include a vignetting diaphragm ST disposed between the third lens E3 and the fourth lens E4.

Table 28 shows surface type, radius of curvature, thickness, material and conic coefficient of each lens of the camera lens assembly in example 10, wherein the units for the radius of curvature and the thickness are millimeter (mm). Table 29 shows high-order coefficients applicable to each aspheric surface in example 10, wherein the surface shape of each aspheric surface may be defined by the formula (1) given in the above example 1. Table 30 shows effective focal lengths f1 to f6 of respective lens, a total effective focal length f of the camera lens assembly, a total track length TTL and half of a maximal field-of-view HFOV in example 10.

TABLE 28

| Surface number | Surface type | Radius of curvature | Thickness | Material | | Conic coefficient |
|---|---|---|---|---|---|---|
| | | | | Refractive index | Abbe number | |
| OBJ | spherical | infinite | infinite | | | |
| S1 (STO) | aspheric | 2.7881 | 0.3428 | 1.55 | 56.1 | 0.0000 |
| S2 | aspheric | 3.8778 | 0.1200 | | | 0.0000 |
| S3 | aspheric | 2.5073 | 0.8432 | 1.55 | 56.1 | 0.0529 |
| S4 | aspheric | −62.4713 | 0.1255 | | | −3.6714 |
| S5 | aspheric | −169.0000 | 0.3420 | 1.67 | 20.4 | −99.0000 |
| S6 | aspheric | 4.6118 | 0.2397 | | | 3.9653 |
| ST | spherical | infinite | 0.3723 | | | |
| S8 | aspheric | 13.5935 | 0.2420 | 1.55 | 56.1 | 75.6813 |
| S9 | aspheric | 12.1952 | 1.0364 | | | 98.5449 |
| S10 | aspheric | −10.3543 | 0.5205 | 1.67 | 20.4 | 39.0937 |
| S11 | aspheric | −4.8790 | 0.4684 | | | 0.0000 |
| S12 | aspheric | 10.9479 | 0.3000 | 1.55 | 56.1 | 23.4184 |
| S13 | aspheric | 2.3093 | 1.0335 | | | −14.4051 |
| S14 | spherical | infinite | 0.3000 | 1.52 | 64.2 | |
| S15 | spherical | infinite | 0.3137 | | | |
| S16 | spherical | infinite | | | | |

TABLE 29

| Surface number | A4 | A6 | A8 | A10 | A12 | A14 | A16 | A18 | A20 |
|---|---|---|---|---|---|---|---|---|---|
| S1 | −9.1489E−03 | −1.1224E−02 | 8.7309E−03 | 2.9554E−03 | −1.0388E−02 | 8.1103E−03 | −2.9589E−03 | 5.0434E−04 | −3.1842E−05 |
| S2 | 1.7356E−03 | −7.6954E−02 | 1.8500E−01 | −2.4009E−01 | 2.0075E−01 | −1.1154E−01 | 4.0474E−02 | −8.7078E−03 | 8.2983E−04 |
| S3 | 9.6720E−03 | −6.3209E−02 | 1.6937E−01 | −2.3443E−01 | 2.0440E−01 | −1.1811E−01 | 4.4064E−02 | −9.5065E−03 | 8.6928E−04 |
| S4 | −3.4085E−02 | 4.3294E−02 | −2.3869E−03 | −6.3522E−02 | 6.8530E−02 | −2.5048E−02 | −1.2016E−03 | 2.7514E−03 | −4.6567E−04 |
| S5 | −3.4448E−02 | 5.8583E−02 | 7.9869E−02 | −3.0092E−01 | 3.7915E−01 | −2.4120E−01 | 7.7522E−02 | −1.0025E−02 | 0.0000E+00 |
| S6 | −2.6596E−02 | 1.0363E−01 | −2.8762E−01 | 9.7574E−01 | −2.1408E+00 | 2.8231E+00 | −2.1610E+00 | 8.8703E−01 | −1.5133E−01 |
| S8 | −1.0111E−01 | 2.0132E−02 | 7.7558E−02 | 2.3591E−02 | −3.8538E−01 | 8.0426E−01 | −7.9776E−01 | 3.9482E−01 | −7.8592E−02 |
| S9 | −9.1072E−02 | 1.2314E−02 | 1.2543E−01 | −2.7581E−01 | 4.1850E−01 | −4.0853E−01 | 2.5256E−01 | −9.0890E−02 | 1.4296E−02 |
| S10 | −1.3367E−02 | −8.2363E−02 | 1.1356E−01 | −1.2891E−01 | 9.7886E−02 | −4.8868E−02 | 1.4564E−02 | −2.2729E−03 | 1.4103E−04 |
| S11 | 3.7749E−02 | −7.9163E−02 | 9.0250E−02 | −7.2746E−02 | 3.9043E−02 | −1.3903E−02 | 3.0283E−03 | −3.5571E−04 | 1.7092E−05 |
| S12 | −2.3246E−01 | 9.7646E−02 | −1.6782E−02 | −2.0873E−03 | 1.0292E−03 | −6.9418E−05 | −1.0303E−05 | 1.5708E−06 | −5.7442E−08 |
| S13 | −1.4178E−01 | 6.9777E−02 | −2.1652E−02 | 4.1266E−03 | −4.8411E−04 | 3.1075E−05 | −7.9220E−07 | −9.5859E−09 | 6.1369E−10 |

TABLE 30

| f1 (mm) | 16.34 | f6 (mm) | −5.42 |
|---|---|---|---|
| f2 (mm) | 4.43 | f (mm) | 6.70 |
| f3 (mm) | −6.71 | TTL (mm) | 6.60 |
| f4 (mm) | −231.06 | HFOV (°) | 28.0 |
| f5 (mm) | 13.30 | | |

Figure 20A:
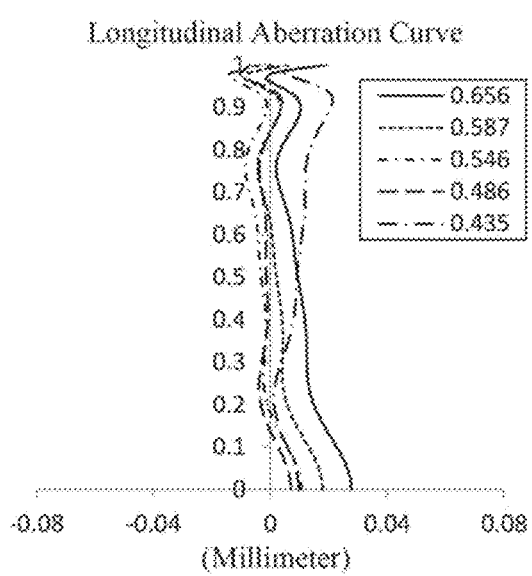
FIGS. 20A to 20D illustrate a longitudinal aberration curve, an astigmatic curve, a distortion curve and a lateral color curve of the camera lens assembly of the Example 10, respectively.
Figure 20B:
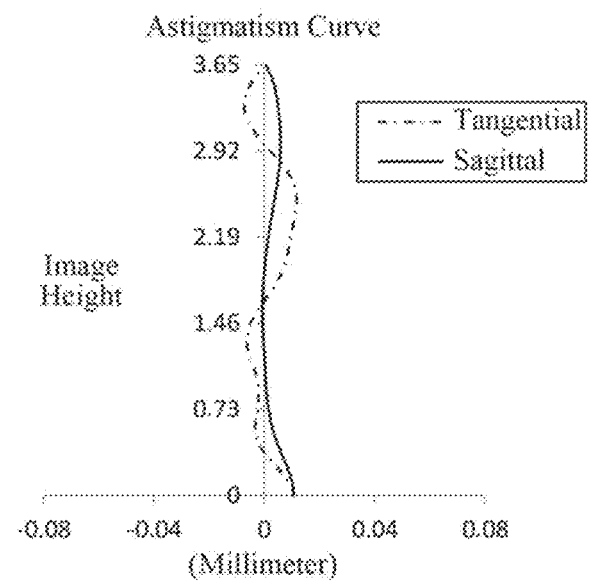
Figure 20C:
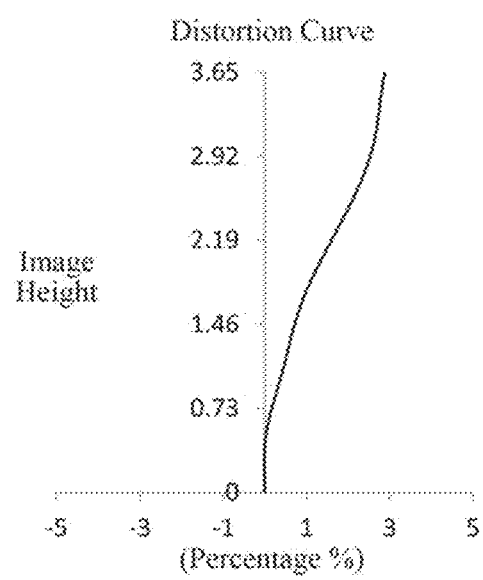
Figure 20D:
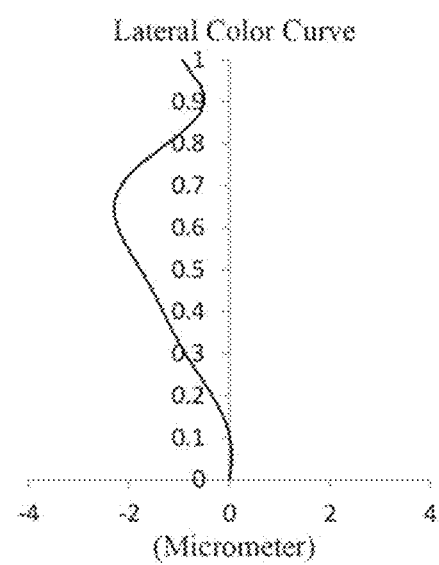

FIG. 20A illustrates a longitudinal aberration curve of the camera lens assembly according to example 10, representing deviations of focal points converged by light of different wavelengths after passing through the camera lens assembly. FIG. 20B illustrates an astigmatism curve of the camera lens assembly according to example 10, representing a curvature of a tangential plane and a curvature of a sagittal plane. FIG. 20C illustrates a distortion curve of the camera lens assembly according to example 10, representing amounts of distortion at different image heights. FIG. 20D illustrates a lateral color curve of the camera lens assembly according to example 10, representing deviations of different image heights on an imaging plane after light passes through the camera lens assembly. It can be seen from FIG. 20A to FIG. 20D that the camera lens assembly provided in example 10 may achieve good image quality.

Example 11

Figure 21:
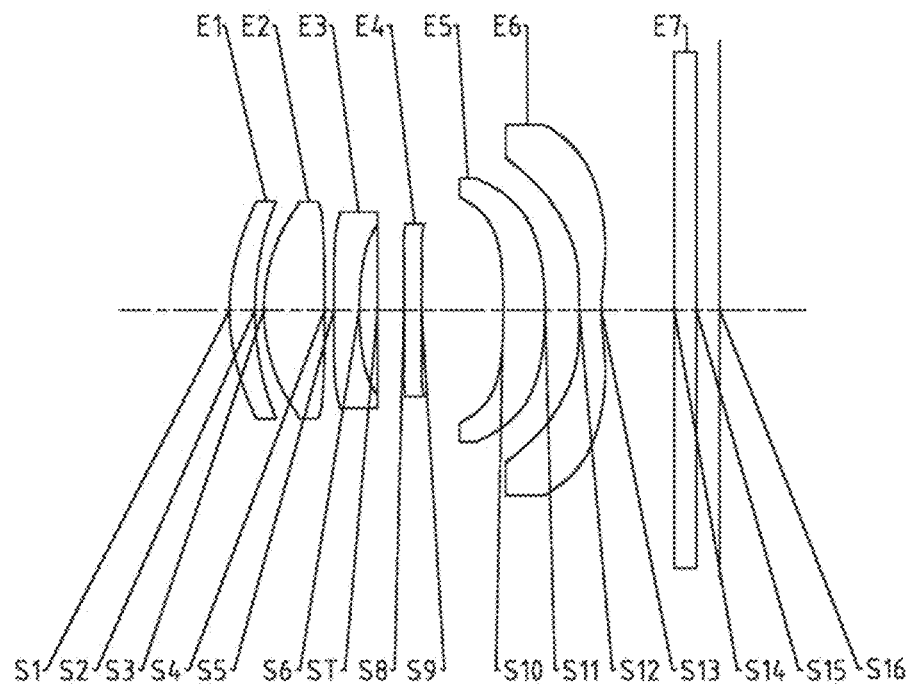
FIG. 21 illustrates a schematic structural view of a camera lens assembly according to Example 11 of the present disclosure.

A camera lens assembly according to example 11 of the present disclosure is described below with reference to FIG. 21 to FIG. 22D. FIG. 21 is a schematic structural view of the camera lens assembly according to example 11 of the present disclosure.

As shown in FIG. 21, the camera lens assembly according to an exemplary embodiment of the present disclosure includes a first lens E1, a second lens E2, a third lens E3, a fourth lens E4, a fifth lens E5, a sixth lens E6, an optical filter E7 and an imaging plane S16, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a convex surface. The third lens E3 has a negative refractive power. An object-side surface S5 of the third lens E3 is a convex surface, and an image-side surface S6 of the third lens E3 is a concave surface. The fourth lens E4 has a negative refractive power. An object-side surface S8 of the fourth lens E4 is a convex surface, and an image-side surface S9 of the fourth lens E4 is a concave surface. The fifth lens E5 has a positive refractive power. An object-side surface S10 of the fifth lens E5 is a concave surface, and an image-side surface S11 of the fifth lens E5 is a convex surface. The sixth lens E6 has a negative refractive power. An object-side surface S12 of the sixth lens E6 is a concave surface, and an image-side surface S13 of the sixth lens E6 is a concave surface. The optical filter E7 has an object-side surface S14 and an image-side surface S15. Light from an object sequentially passes through the respective surfaces S1 to S15 and is finally imaged on the imaging plane S16.

In the camera lens assembly of this example, an aperture diaphragm STO for restricting a light beam may be disposed between the object side and the first lens E1 to improve image quality. Optionally, the camera lens assembly may further include a vignetting diaphragm ST disposed between the third lens E3 and the fourth lens E4.

Table 31 shows surface type, radius of curvature, thickness, material and conic coefficient of each lens of the camera lens assembly in example 11, wherein the units for the radius of curvature and the thickness are millimeter (mm). Table 32 shows high-order coefficients applicable to each aspheric surface in example 11, wherein the surface shape of each aspheric surface may be defined by the formula (1) given in the above example 1. Table 33 shows effective focal lengths f1 to f6 of respective lens, a total effective focal length f of the camera lens assembly, a total track length TTL and half of a maximal field-of-view HFOV in example 11.

TABLE 31

| Surface number | Surface type | Radius of curvature | Thickness | Material Refractive index | Material Abbe number | Conic coefficient |
|---|---|---|---|---|---|---|
| OBJ | spherical | infinite | infinite | | | |
| S1 (STO) | aspheric | 2.7619 | 0.3428 | 1.55 | 56.1 | 0.0000 |
| S2 | aspheric | 3.8022 | 0.1200 | | | 0.0000 |
| S3 | aspheric | 2.4850 | 0.8160 | 1.55 | 56.1 | 0.1114 |

TABLE 31-continued

| Surface number | Surface type | Radius of curvature | Thickness | Material Refractive index | Abbe number | Conic coefficient |
|---|---|---|---|---|---|---|
| S4 | aspheric | −355.7800 | 0.1257 | | | −97.2400 |
| S5 | aspheric | 39.4968 | 0.3420 | 1.67 | 20.4 | 98.8687 |
| S6 | aspheric | 4.1641 | 0.2455 | | | 4.8003 |
| ST | spherical | infinite | 0.3560 | | | |
| S8 | aspheric | 13.5935 | 0.2375 | 1.55 | 56.1 | 74.8142 |
| S9 | aspheric | 12.3527 | 1.1007 | | | 93.9041 |
| S10 | aspheric | −10.3090 | 0.5627 | 1.67 | 20.4 | 36.7512 |
| S11 | aspheric | −4.4624 | 0.4593 | | | 0.0000 |
| S12 | aspheric | −17577.9947 | 0.3000 | 1.55 | 56.1 | 68727985.4748 |
| S13 | aspheric | 2.7216 | 0.9782 | | | −17.5441 |
| S14 | spherical | infinite | 0.3000 | 1.52 | 64.2 | |
| S15 | spherical | infinite | 0.3137 | | | |
| S16 | spherical | infinite | | | | |

TABLE 32

| Surface number | A4 | A6 | A8 | A10 | A12 | A14 | A16 | A18 | A20 |
|---|---|---|---|---|---|---|---|---|---|
| S1 | −1.0339E−02 | −8.2232E−03 | 4.6563E−04 | 1.5752E−02 | −2.1225E−02 | 1.3340E−02 | −4.3830E−03 | 7.0038E−04 | −4.1349E−05 |
| S2 | −2.7910E−03 | −5.4665E−02 | 1.1854E−01 | −1.1962E−01 | 7.1072E−02 | −2.7301E−02 | 7.9844E−03 | −1.8605E−03 | 2.2321E−04 |
| S3 | 6.5013E−03 | −4.7303E−02 | 1.1770E−01 | −1.3289E−01 | 8.5232E−02 | −3.3621E−02 | 8.3096E−03 | −1.1270E−03 | 2.5485E−05 |
| S4 | −3.5150E−02 | 4.2823E−02 | −7.8214E−04 | −6.6352E−02 | 7.1328E−02 | −2.6726E−02 | −5.3704E−04 | 2.5838E−03 | −4.4822E−04 |
| S5 | −3.4986E−02 | 6.1721E−02 | 7.7839E−02 | −3.0544E−01 | 3.9232E−01 | −2.5379E−01 | 8.2738E−02 | −1.0841E−02 | 0.0000E+00 |
| S6 | −2.8109E−02 | 1.0929E−01 | −2.8754E−01 | 9.4161E−01 | −2.0556E+00 | 2.7413E+00 | −2.1358E+00 | 8.9444E−01 | −1.5587E−01 |
| S8 | −9.6751E−02 | −5.0477E−02 | 5.4599E−01 | −1.6665E+00 | 3.2153E+00 | −3.8511E+00 | 2.7876E+00 | −1.1167E+00 | 1.8967E−01 |
| S9 | −8.6343E−02 | −4.1060E−02 | 3.9882E−01 | −1.0681E+00 | 1.7944E+00 | −1.8675E+00 | 1.1736E+00 | −4.0723E−01 | 5.9601E−02 |
| S10 | −9.1515E−03 | −8.5604E−02 | 1.0646E−01 | −1.0203E−01 | 6.4297E−02 | −2.6696E−02 | 6.5601E−03 | −8.0026E−04 | 3.3501E−05 |
| S11 | 1.6579E−02 | −1.0069E−01 | 1.1402E−01 | −8.6122E−02 | 4.2740E−02 | −1.4055E−02 | 2.8593E−03 | −3.1788E−04 | 1.4603E−05 |
| S12 | −1.9228E−01 | 6.2433E−02 | 1.5646E−02 | −1.9531E−02 | 6.3688E−03 | −1.0213E−03 | 8.7454E−05 | −3.7928E−06 | 6.4387E−08 |
| S13 | −1.3814E−01 | 7.2057E−02 | −2.2426E−02 | 4.1323E−03 | −4.6226E−04 | 2.9161E−05 | −8.5677E−07 | 2.8080E−09 | 2.5688E−10 |

TABLE 33

| f1 (mm) | 16.54 | f6 (mm) | −4.98 |
|---|---|---|---|
| f2 (mm) | 4.52 | f (mm) | 6.70 |
| f3 (mm) | −6.99 | TTL (mm) | 6.60 |
| f4 (mm) | −265.59 | HFOV (°) | 27.9 |
| f5 (mm) | 11.34 | | |

Figure 22A:
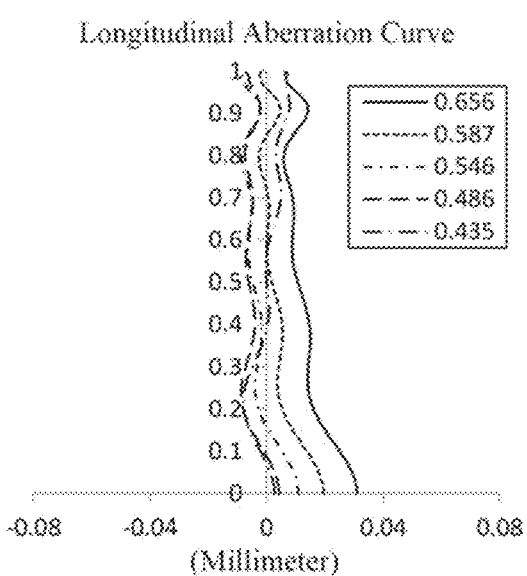
FIGS. 22A to 22D illustrate a longitudinal aberration curve, an astigmatic curve, a distortion curve and a lateral color curve of the camera lens assembly of the Example 11, respectively.
Figure 22B:
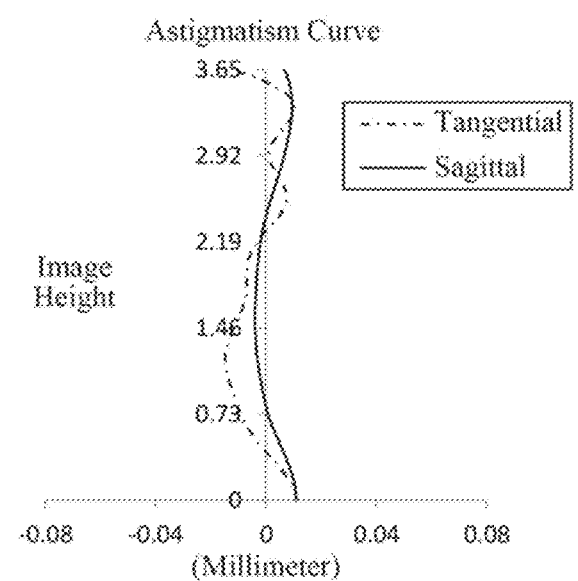
Figure 22C:
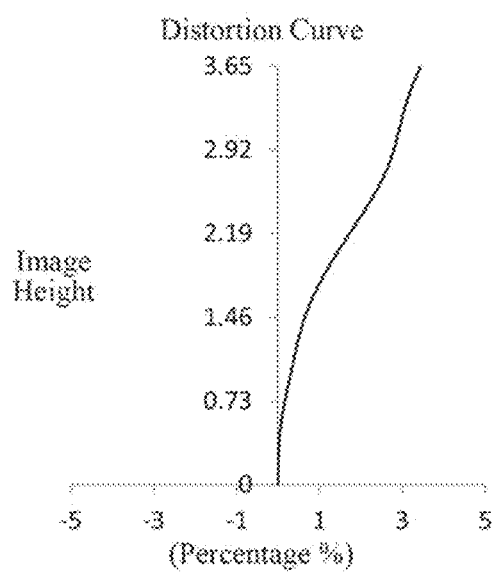
Figure 22D:
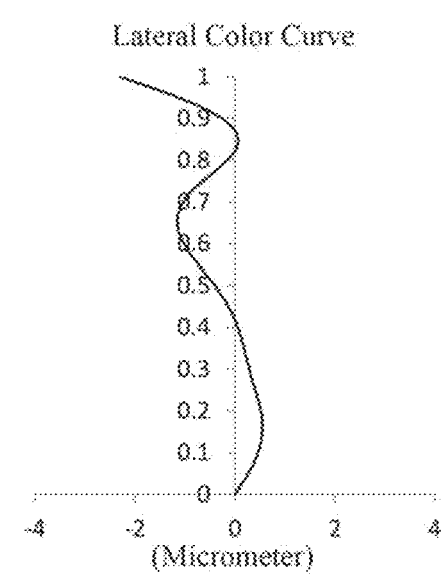

FIG. 22A illustrates a longitudinal aberration curve of the camera lens assembly according to example 11, representing deviations of focal points converged by light of different wavelengths after passing through the camera lens assembly. FIG. 22B illustrates an astigmatism curve of the camera lens assembly according to example 11, representing a curvature of a tangential plane and a curvature of a sagittal plane. FIG. 22C illustrates a distortion curve of the camera lens assembly according to example 11, representing amounts of distortion at different image heights. FIG. 22D illustrates a lateral color curve of the camera lens assembly according to example 11, representing deviations of different image heights on an imaging plane after light passes through the camera lens assembly. It can be seen from FIG. 22A to FIG. 22D that the camera lens assembly provided in example 11 may achieve good image quality.

In view of the above, examples 1 to 11 respectively satisfy the relationship shown in Table 34.

| Condition | Example | | | | | | | | | | |
| | 1 | 2 | 3 | 4 | 5 | 6 | 7 | 8 | 9 | 10 | 11 |
|---|---|---|---|---|---|---|---|---|---|---|---|
| ImgH/f | 0.54 | 0.54 | 0.48 | 0.50 | 0.52 | 0.57 | 0.54 | 0.54 | 0.54 | 0.54 | 0.54 |
| f1/(R1 + R2) | 3.55 | 2.60 | 2.67 | 2.78 | 2.91 | 3.49 | 2.48 | 2.48 | 2.51 | 2.45 | 2.52 |
| f2/|R3| | 2.16 | 2.16 | 2.16 | 2.15 | 2.13 | 2.12 | 1.97 | 1.83 | 1.81 | 1.77 | 1.82 |
| f5/f6 | −2.16 | −2.11 | −1.84 | −1.59 | −1.62 | −1.75 | −2.19 | −2.37 | −2.35 | −2.45 | −2.28 |
| TTL/f | 0.99 | 0.99 | 0.96 | 1.00 | 1.01 | 1.04 | 0.99 | 0.99 | 0.99 | 0.99 | 0.99 |
| R8/R7 | 0.85 | 0.83 | 0.23 | 0.24 | 0.29 | 0.69 | 1.00 | 0.92 | 0.92 | 0.90 | 0.91 |
| T45/(T34 + CT4) | 0.86 | 0.79 | 1.05 | 1.05 | 1.03 | 0.94 | 0.97 | 1.05 | 1.08 | 1.21 | 1.31 |
| CT2/CT1 | 2.28 | 2.32 | 2.23 | 2.23 | 2.27 | 2.33 | 2.34 | 2.41 | 2.45 | 2.46 | 2.38 |
| |f5/R9| | 1.49 | 1.33 | 1.98 | 1.76 | 1.69 | 1.60 | 1.28 | 1.25 | 1.21 | 1.28 | 1.10 |
| |f56/f123| | 1.98 | 1.95 | 2.88 | 3.90 | 3.85 | 3.27 | 1.75 | 1.67 | 1.70 | 1.64 | 1.60 |
| DT11 × DT21/DT51 (mm) | 1.43 | 1.58 | 1.22 | 1.40 | 1.39 | 1.36 | 1.51 | 1.50 | 1.49 | 1.51 | 1.41 |
| HFOV (°) | 27.7 | 27.9 | 24.7 | 25.7 | 26.6 | 28.6 | 28.1 | 28.0 | 28.0 | 28.0 | 27.9 |

The present disclosure further provides a camera apparatus, having a photosensitive element which may be a photosensitive Charge-Coupled Device (CCD) or a Complementary Metal-Oxide Semiconductor (CMOS). The camera apparatus may be an independent camera device such as a digital camera, or may be a camera module integrated in a mobile electronic device such as a mobile phone. The camera apparatus is equipped with the camera lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens assembly, comprising: a first lens, a second lens, a third lens, a fourth lens, a fifth lens and a sixth lens, which are sequentially arranged from an object side of the camera lens assembly to an image side of the camera lens assembly along an optical axis of the camera lens assembly,
    wherein,
    the first lens has a positive refractive power;
    the second lens has a positive refractive power;
    the third lens has a refractive power;
    the fourth lens has a refractive power and an object-side surface of the fourth lens is a convex surface;
    the fifth lens has a positive refractive power, and
    the sixth lens has a negative refractive power;
    wherein $0.4 < \text{ImgH}/f < 0.6$, where ImgH is half of a diagonal length of an effective pixel area on an imaging plane of the camera lens assembly and f is a total effective focal length of the camera lens assembly, and
    wherein $2 < f1/(R1+R2) < 4.5$, where f1 is an effective focal length of the first lens, R1 is a radius of curvature of an object-side surface of the first lens and R2 is a radius of curvature of an image-side surface of the first lens.

2. The camera lens assembly according to claim 1, wherein $1.5 < f2/|R3| < 2.5$,
    where f2 is an effective focal length of the second lens and R3 is a radius of curvature of an object-side surface of the second lens.

3. The camera lens assembly according to claim 1, wherein $-2.5 < f5/f6 < -1.5$,
    where f5 is an effective focal length of the fifth lens and f6 is an effective focal length of the sixth lens.

4. The camera lens assembly according to claim 1, wherein $0.2 < R8/R7 \leq 1$,
    where R7 is a radius of curvature of the object-side surface of the fourth lens and R8 is a radius of curvature of an image-side surface of the fourth lens.

5. The camera lens assembly according to claim 1, wherein $1 < |f5/R9| < 2$,
    where f5 is an effective focal length of the fifth lens and R9 is a radius of curvature of an object-side surface of the fifth lens.

6. The camera lens assembly according to claim 1, wherein $0.6 < T45/(T34+CT4) < 1.5$,
    where T45 is a spaced distance between the fourth lens and the fifth lens on the optical axis, T34 is a spaced distance between the third lens and the fourth lens on the optical axis and CT4 is a center thickness of the fourth lens on the optical axis.

7. The camera lens assembly according to claim 1, wherein $2 < CT2/CT1 < 2.5$,
    where CT1 is a center thickness of the first lens on the optical axis and CT2 is a center thickness of the second lens on the optical axis.

8. The camera lens assembly according to claim 1, wherein $1 \text{ mm} < DT11 \times DT21/DT51 < 2 \text{ mm}$,
    where DT11 is a maximum effective radius of an object-side surface of the first lens, DT21 is a maximum effective radius of an object-side surface of the second lens and DT51 is a maximum effective radius of an object-side surface of the fifth lens.

9. The camera lens assembly according to claim 1, wherein $1.5 < |f56/f123| < 4$,
    where f56 is a combined focal length of the fifth lens and the sixth lens and f123 is a combined focal length of the first lens, the second lens and the third lens.

10. The camera lens assembly according to claim 1, wherein $TTL/f < 1.1$,
    where TTL is a distance on the optical axis from the object-side surface of the first lens to the imaging plane of the camera lens assembly and f is the total effective focal length of the camera lens assembly.

11. A camera lens assembly, comprising: a first lens, a second lens, a third lens, a fourth lens, a fifth lens and a sixth lens, which are sequentially arranged from an object side of the camera lens assembly to an image side of the camera lens assembly along an optical axis of the camera lens assembly,
    wherein,
    the first lens has a positive refractive power and an image-side surface of the first lens is a concave surface;
    the second lens has a positive refractive power and an object-side surface of the second lens is a convex surface;
    the third lens has a refractive power;
    the fourth lens has a refractive power;
    the fifth lens has a positive refractive power and an object-side surface of the fifth lens is a concave surface; and
    the sixth lens has a negative refractive power;
    wherein $20° < HFOV < 30°$, where HFOV is half of a maximal field-of-view of the camera lens assembly, and
    wherein $2 < f1/(R1+R2) < 4.5$, where f1 is an effective focal length of the first lens, R1 is a radius of curvature of an object-side surface of the first lens and R2 is a radius of curvature of an image-side surface of the first lens.

12. The camera lens assembly according to claim 11, wherein $1.5 < f2/|R3| < 2.5$,
    where f2 is an effective focal length of the second lens and R3 is a radius of curvature of the object-side surface of the second lens.

13. The camera lens assembly according to claim 11, wherein $0.6 < T45/(T34+CT4) < 1.5$,
    where T45 is a spaced distance between the fourth lens and the fifth lens on the optical axis, T34 is a spaced distance between the third lens and the fourth lens on the optical axis and CT4 is a center thickness of the fourth lens on the optical axis.

14. The camera lens assembly according to claim 11, wherein $2 < CT2/CT1 < 2.5$,
    where CT1 is a center thickness of the first lens on the optical axis and CT2 is a center thickness of the second lens on the optical axis.

15. The camera lens assembly according to claim 11, wherein $1.5<|f56/f123|<4$,
where f56 is a combined focal length of the fifth lens and the sixth lens and f123 is a combined focal length of the first lens, the second lens and the third lens.

16. The camera lens assembly according to claim 11, wherein $1\ mm<DT11\times DT21/DT51<2\ mm$,
where DT11 is a maximum effective radius of an object-side surface of the first lens, DT21 is a maximum effective radius of the object-side surface of the second lens and DT51 is a maximum effective radius of the object-side surface of the fifth lens.

17. The camera lens assembly according to claim 11, wherein $-2.5<f5/f6<-1.5$,
where f5 is an effective focal length of the fifth lens and f6 is an effective focal length of the sixth lens.

18. The camera lens assembly according to claim 11, wherein $TTL/f<1.1$,
where TTL is a distance on the optical axis from the object-side surface of the first lens to an imaging plane of the camera lens assembly and f is a total effective focal length of the camera lens assembly.

* * * * *